(12) United States Patent
Guo

(10) Patent No.: US 8,233,301 B1
(45) Date of Patent: Jul. 31, 2012

(54) IMPEDANCE DROPPING DC POWER SUPPLY HAVING AN IMPEDANCE CONTROLLED CONVERTER

(75) Inventor: Zhijiang Guo, Bellingham, WA (US)

(73) Assignee: SensorLink Corporation, Ferndale, WA (US)

( * ) Notice: Subject to any disclaimer, the term of this patent is extended or adjusted under 35 U.S.C. 154(b) by 892 days.

(21) Appl. No.: 12/317,354

(22) Filed: Dec. 20, 2008

(51) Int. Cl.
  *H02M 7/49* (2007.01)
  *H02M 7/505* (2006.01)
  *H02M 7/515* (2007.01)

(52) U.S. Cl. ........ 363/140; 363/125; 363/126; 363/127; 363/128

(58) Field of Classification Search .............. 363/85–86, 363/89–90, 100, 123, 125–128, 140, 147, 363/164–165
See application file for complete search history.

(56) References Cited

U.S. PATENT DOCUMENTS

| | | | |
|---|---|---|---|
| 4,482,664 A * | 11/1984 | Blum et al. .................... 524/212 |
| 5,055,994 A | 10/1991 | Schoofs | |
| 5,341,284 A | 8/1994 | Huang | |
| 5,341,285 A | 8/1994 | Wakefield et al. | |
| 5,345,376 A | 9/1994 | Nourbakhsh | |
| 5,416,387 A * | 5/1995 | Cuk et al. .................. 315/209 R |
| 5,426,350 A | 6/1995 | Lai | |
| 5,426,579 A | 6/1995 | Paul et al. | |
| 5,442,259 A | 8/1995 | Lameris et al. | |
| 5,469,046 A | 11/1995 | Wong et al. | |
| 5,499,154 A | 3/1996 | Cullison | |
| 5,528,686 A | 6/1996 | Cwynar et al. | |
| 5,555,494 A | 9/1996 | Morris | |
| 5,587,629 A | 12/1996 | Gornstein | |
| 5,610,807 A | 3/1997 | Kanda et al. | |
| 5,612,580 A | 3/1997 | Janonis et al. | |
| 5,646,514 A | 7/1997 | Tsunetsugu | |
| 5,656,896 A | 8/1997 | Ogiwara et al. | |
| 5,661,645 A * | 8/1997 | Hochstein ....................... 363/89 |
| 5,717,320 A | 2/1998 | Heeringa et al. | |
| 5,729,120 A | 3/1998 | Stich et al. | |
| 5,818,708 A | 10/1998 | Wong | |
| 5,886,506 A | 3/1999 | Ozawa | |
| 5,892,351 A | 4/1999 | Faulk | |
| 5,914,869 A | 6/1999 | Troiano | |
| 5,986,907 A | 11/1999 | Limpaecher | |
| 6,014,325 A | 1/2000 | Pecore | |
| 6,057,673 A | 5/2000 | Okayama | |
| 6,061,259 A * | 5/2000 | DeMichele ................... 363/125 |
| 6,107,886 A | 8/2000 | Kusakabe et al. | |
| 6,175,163 B1 | 1/2001 | Rinaldi et al. | |
| 6,188,200 B1 | 2/2001 | Maiorano | |
| 6,198,257 B1 | 3/2001 | Belehradek et al. | |
| 6,285,572 B1 | 9/2001 | Onizuka et al. | |
| 6,300,748 B1 | 10/2001 | Miller | |
| 7,006,366 B2 | 2/2006 | Panda et al. | |
| 7,023,176 B2 | 4/2006 | Maebashi et al. | |
| 7,079,406 B2 | 7/2006 | Kurokami et al. | |
| 7,088,601 B2 | 8/2006 | Tracy et al. | |
| 7,102,478 B2 | 9/2006 | Pridmore, Jr. et al. | |
| 7,132,819 B1 | 11/2006 | Cope et al. | |
| 7,176,662 B2 | 2/2007 | Chandrasekaran | |

(Continued)

*Primary Examiner* — Matthew Nguyen
*Assistant Examiner* — Nusrat Quddus
(74) *Attorney, Agent, or Firm* — Gregory W. Moravan

(57) ABSTRACT

An impedance dropping dc power supply having an impedance controlled converter whose impedance adaptively changes as a function of the power supply's load impedance, to maintain the ac voltage across the primary winding of its power transformer below a predetermined maximum level, and to minimize the waste heat generated by the power supply that would otherwise have to be dissipated.

39 Claims, 6 Drawing Sheets

U.S. PATENT DOCUMENTS

| | | |
|---|---|---|
| 7,200,176 B1 | 4/2007 | Paulos et al. |
| 7,209,373 B2 | 4/2007 | Oicles et al. |
| 7,212,414 B2 | 5/2007 | Baarman |
| 7,259,479 B1 | 8/2007 | Momber |
| 7,262,582 B2 | 8/2007 | Warita et al. |
| 7,269,037 B2 | 9/2007 | Marquardt |
| 7,298,118 B2 | 11/2007 | Chandrasekaran |
| 7,304,872 B1 | 12/2007 | Yakymyshyn et al. |
| 7,324,772 B2 | 1/2008 | Harris et al. |
| 7,359,640 B2 | 4/2008 | Onde et al. |
| 7,371,963 B2 | 5/2008 | Suenaga et al. |
| 7,385,375 B2 | 6/2008 | Rozman |
| 7,388,306 B2 | 6/2008 | Peterson |
| 2005/0007082 A1* | 1/2005 | Bretz et al. .................. 323/274 |

* cited by examiner

IMPEDANCE DROPPING DC POWER SUPPLY HAVING AN IMPEDANCE CONTROLLED CONVERTER

STATEMENT REGARDING FEDERALLY SPONSORED RESEARCH OR DEVELOPMENT

The invention was not made by an agency of the United States Government or under a contract with an agency of the United States Government.

DETAILED DESCRIPTION OF THE INVENTION

Figure 1:
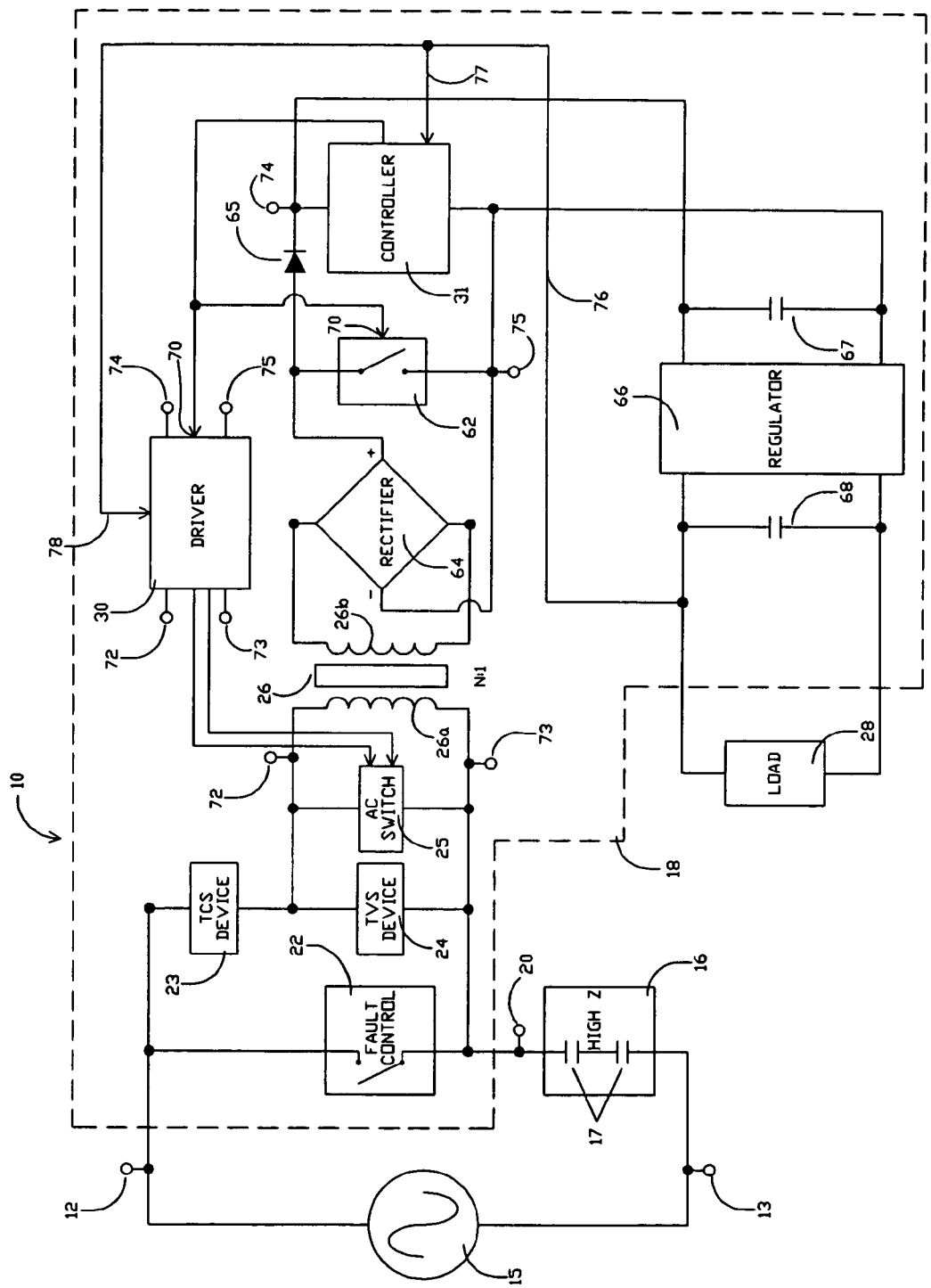
FIG. 1 is a schematic diagram of an impedance dropping dc power supply 10 having an impedance controlled converter 18.

As will be made apparent by all of the disclosures herein, the power supply 10 may offer one or more of the following advantages.

It may be compact in size, light in weight, low in cost, stable in operation, and have a long life. It may also have a wide range of ac input voltages.

Further, the power supply 10 may have a very low power loss (i.e., have a very low heat dissipation), regardless of its ac input voltage, impedance variations of its high impedance device 16, impedance variations of its load 28, or the amount of power delivered to its load 28, thereby helping to improve its efficiency, and extending its operating lifetime and stability of operation by helping to prevent the premature aging, damage, or failure of its various components that might otherwise occur if it dissipated large amounts of heat.

In addition, the power supply 10 may not need a separate independent dc power supply or a backup battery to support its operations because it draws its power from the ac voltage source 15, and because of the large capacitors 44, 45 in its controller 31.

The power supply 10 may have a fault control device 22 to help prevent any catastrophic failure of the power supply 10 in the event its TCS (Transient Current Suppression) device 23, TVS (Transient Voltage Suppression) device 24, ac switch 25, or power transformer 26 should fail.

The Power Supply 10 of FIGS. 1-4:

Illustrated in FIG. 1 is a schematic diagram of a high voltage impedance dropping dc power supply 10 for converting a high ac input voltage from a high voltage ac source 15 into a low dc output voltage for a load 28. The power supply 10 may comprise any suitable ac input terminals 12, 13 for receiving a high ac input voltage from the high voltage source 15; any suitable high voltage, high impedance input device 16; and any suitable impedance controlled converter 18. In the context of the power supply 10, the term "high voltage" means an ac input voltage that is a minimum of about 600 V ac, up to 100 kV, or more. However, for many applications of the power supply 10, the high voltage ac source 15 will typically be in the range of from about 4 kV to about 35 kV.

The power supply 10 is an impedance dropping type of power supply since it has a high voltage, high impedance input device 16 connected in series with the primary winding 26a of its power transformer 26. An impedance dropping type of power supply 10 may also be called an impedance coupling power supply or a reactive power supply.

On the other hand, the term "impedance controlled" converter 18 means that the average input impedance of the converter 18 at its input terminals 12, 20 may be controlled, i.e., may be a function of, the impedance of the load 28, once the input impedance of the converter 18 at its input terminals 12, 20 has reached a certain "threshold value". This "threshold value" will be explained below. The important benefits that may be achieved by using the load 28's impedance to control the converter 18's average input impedance will be explained in detail below.

The high voltage side of the power supply 10 and the converter 18 are those components which are connected, directly or indirectly, to the primary winding 26a of the transformer 26, i.e., the high impedance device 16, the fault control device 22, the TCS device 23, the TVS device 24, and the ac switch 25.

The power supply 10 may be designed to receive any of a wide range of high ac input voltages through its input terminals 12, 13 from any suitable high voltage ac source 15, such as from a single phase from a power line that may carry from several thousand volts or less, up to one hundred kV, or more. The ac source 15 may be connected across the input terminals 12, 13 in any suitable way, such as by using a hot stick to connect a wire from the power line to one of the input terminals, 12, 13; and by connecting the other input terminal 12, 13 to ground.

The power supply 10 may be designed to provide a stable, low voltage dc output voltage that is sufficient to meet the needs of any particular load 28. For example, the load 28 may be a voltage, current, power, or other measuring device that may be used in local, regional or national high voltage electrical power distribution grids. The power supply 10 may be designed to provide power to loads 28 having any of a wide range of load impedances, from a few Ohms, or less, up to infinity (an open circuit).

The High Voltage, High Impedance Input Device 16:

The power supply 10 may comprise any suitable high voltage, high impedance input device 16, such as one comprising at least one of any suitable: (a) high voltage resistor, (b) high voltage coil, (c) high voltage capacitor, or any suitable combination thereof.

The functions of the input device 16 may include, for example, helping to control: (a) the ac voltage drop across the primary winding 26a of the transformer 26; (b) the maximum amount of ac current passing though the primary winding 26a of the power transformer 26 of the converter 18; and (c) the maximum continuous current output capacity of the power supply 10 (i.e., the maximum continuous power output capacity of the power supply 10). Thus, the impedance selected for the device 16 will vary depending on such factors as one or more of the above design parameters; and may typically be at least about 500 kΩ, although it may be less than this amount. For example, in the example power supply 10 that is described in detail below, the device 16 (capacitors 17) had an impedance of about 472.8 kΩ.

If the input device 16 is selected to comprise at least one of any suitable high voltage resistor, then the power supply 10 may be perfectly acceptable if any suitable steps that are needed are taken to dissipate the power loss (i.e., the waste heat) generated by the resistor(s) (e.g., thermal isolation, a heat sink, or a cooling fan), in order to prevent any undesirable build up of waste heat in the power supply 10 that may result in the failure of one or more of its components. An advantage of using at least one high voltage resistor may be the small size of the resistor(s), which may make the power supply 10 physically smaller as compared to if the input device 16 comprised at least one high voltage coil.

If the input device 16 is selected to comprise at least one of any suitable high voltage coil, one disadvantage may be the relatively large physical size of the coil(s), which may make the power supply 10 physically larger than if the input device comprised at least one high voltage resistor or at least one high voltage capacitor. However, such a power supply 10 may be perfectly acceptable if the physical size of the power supply 10 and dissipating the waste heat generated by the coil(s) are not of concern.

If the input device 16 is selected to comprise at least one of any suitable high voltage capacitors 17 (see FIG. 1), then the power supply 10 may be perfectly acceptable if any suitable steps that are needed are taken to dissipate the waste heat generated by the capacitor(s) 17 (e.g., thermal isolation, heat sinks, or cooling fan). Alternatively, the capacitors(s) 17 may be selected to have a relatively small effective series resistance (ESR) in order to reduce the amount of the waste heat generated by the capacitor(s) 17, so that no additional steps may be needed to dissipate the waste heat generated by the capacitor(s) 17. Advantages of using the capacitor(s) 17 may be their small size and the low amount of waste heat that they generate (which may eliminate the need for any waste heat dissipation devices such as thermal isolation, a heat sink, or a cooling fan); and which may make the power supply 10 physically smaller as compared to if the input device 16 comprised high voltage coil(s) or high voltage resistor(s) which needed steps taken to dissipate the waste heat generated by the coil(s) or resistor(s).

For simplicity and clarity of understanding in the discussion that follows, the high impedance device 16 will be treated as comprising at least one high voltage capacitor 17. If there is more than one high voltage capacitor 17, then they may be connected together in any suitable series or parallel structure, to provide any desired amount of capacitance at any desired high voltage ac input voltage range for a particular power supply 10; it being understood that at least one of any suitable high voltage resistor or at least one of any suitable high voltage coil may be used in lieu of or in addition to, the high voltage capacitor(s) 17.

In general, the needed capacitance of the capacitor(s) 17 is a function of the desired maximum continuous current output capacity of the power supply 10; and will generally increase as the desired maximum continuous current output capacity of the power supply 10 increases, and vice versa.

A single input capacitor 17 may be used. Alternatively, as seen in FIG. 1, a series string of input capacitors 17 may also be used because, as is known, when the capacitors 17 are connected in series they will divide the high ac input voltage among themselves in proportion to their respective capacitances, meaning that each capacitor 17 does not have to be rated at the full ac input voltage. For example, if three identical capacitors 17, each rated at 600V ac, are connected to form a capacitor string, then 1,800V ac may be applied across such a capacitor string. But this comes at the price of reducing the overall capacitance provided by such a capacitor string. However, the overall capacitance of the capacitors 17 may be increased to any desired amount by using two or more strings of capacitors 17 in parallel.

The High Voltage Side of the Converter 18:

As seen in FIG. 1, the converter 18 may comprise on its high voltage side any suitable fault control device 22, any suitable TCS device 23, any suitable TVS device 24, any suitable ac switch 25, and the primary winding 26a of any suitable step down power transformer 26.

The TVS device 24 and the ac switch 25 may be connected in parallel with the primary winding 26a of the transformer 26, to form a parallel network which may be connected in series with the TCS device 23. The fault control device 22 may be connected in parallel with the series connected TCS device 23 and TVS device 24. The fault control device 22 and the high impedance device 16 may be connected in series across the power supply 10's ac input terminals 12, 13.

The Fault Control Device 22:

It is possible that the power supply 10 may encounter a self-induced overheating problem due to damage or failure of one or more of its various components, such as its TCS device 23, TVS device 24, ac switch 25, or the primary winding 26a of its transformer 26, caused by such things as environmental impacts on the power supply 10, or by the aging of the affected component. Such damage or failure may increase the affected component's impedance (up to infinity for an affected component that becomes an open circuit), thereby increasing the amount of the input high voltage from the ac source 15 that is dropped across all of the components 23-26.

If this increased ac high voltage is higher than the respective designed operating voltage of one or more of the components 23-26, it may lead to an intermittent or continuous corona discharge across one or more of the components 23-26 that heats each of the corona discharge affected components 23-26.

Such heating may, in turn, cause heating of other components in the power supply 10, such as the high voltage input capacitors 17. If unchecked, such heating may eventually cause the failure of other components in the power supply 10, such as a catastrophic failure of the high voltage input capacitors 17.

Accordingly, in order to prevent damage to the power supply 10 that may otherwise result from such self-induced overheating, the fault control device 22 may be selected to be a normally open, temperature controlled fault control device 22 that will automatically permanently close at any predetermined temperature limit, to protect the other components in the power supply 10 by providing a permanent shunt between the ac input connections 11, 20 of its converter 18.

Any suitable electrical, electrical/mechanical, electronic, or electronic/mechanical fault control device 22 that is wired in parallel with the components 23-26 may be used that is normally open, but which will automatically and permanently close when it reaches its predetermined high temperature limit.

Figure 6:
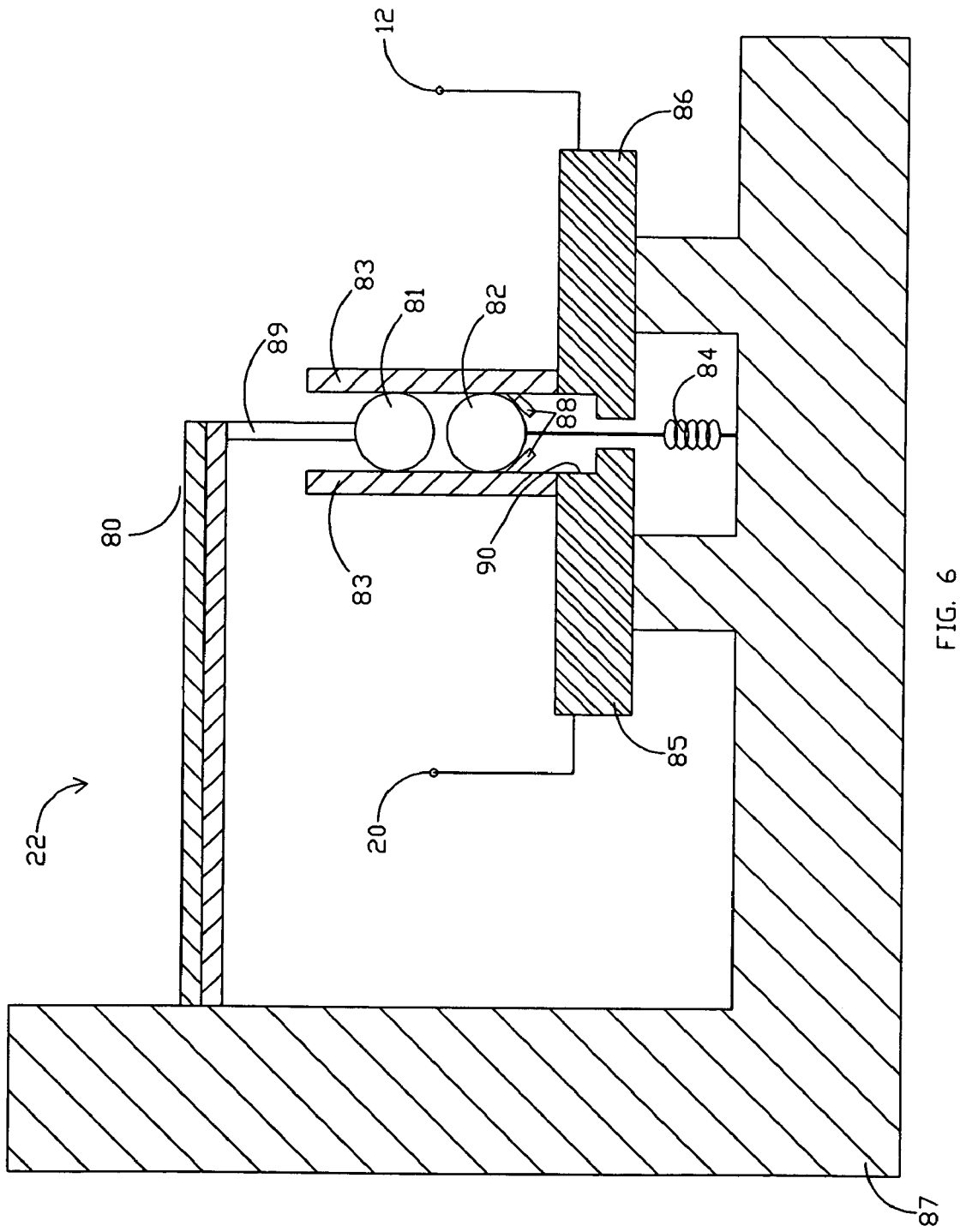
FIG. 6 is a diagrammatic illustration of a fault control device 22, taken partly in cross-section.

For example, the electrical/mechanical fault control device 22 illustrated in FIG. 6 may be used. It may comprise any suitable bimetal member 80; any suitable push member 81; any suitable conductive switch member 82; any suitable holder 83 for members 81, 82; any suitable tensioning member 84; any suitable conductors 85, 86; any suitable base 87; any suitable releasable holder 88 for the switch member 82, and any suitable push rod 89. The conductors 85, 86 may form any suitable switch cavity 90.

Any suitable bimetal member 80 may be used, such as a bimetal strip 80 or disc 80. For simplicity, a bimetal strip 80 is illustrated in FIG. 6, it being understood that a person of ordinary skill in the art would be able to easily modify the structure illustrated in FIG. 6 to utilize a bimetal disc 80 instead of a bimetal strip 80 in view of all of the disclosures herein.

One portion of the bimetal strip 80 may be secured to the base 87, while its free, moveable end may have a push rod 89 secured to it. The push rod 89 may have secured to its free end any suitable push member 81, such as a push ball 81, for selectively pushing against the switch member 82. Alternatively, the push member 81 may be eliminated, and the push rod 89 may sized so that its free end may selectively push directly against the switch member 82. Any suitable switch member 82 may be used, such as a switch ball 82.

The holder 83 may non-conductive and may be sized to receive the push member 81 and the switch member 82, and may be secured to the conductors 85, 86. The switch member 82 may be releasably held in the holder 83 by any suitable releasable holder 88, such as by a pair of spring strips 88. Any suitable tension member 84, such as a tension spring 84, may extend between the base 87 and the switch member 82, and may be selected to provide a tension on the switch member 82 throughout the range of motion of the switch member 82.

The fault control device 22 illustrated in FIG. 6 is a normally open switch because when the bimetal strip 80 has not reached its predetermined high temperature limit, the switch member 82 is in the position illustrated in FIG. 6, and the conductors 85, 86 are not connected together by the switch member 82.

However, when the bimetal strip 80 reaches its predetermined high temperature limit, the bimetal strip will bend, and cause the push rod 89 and push member 81 to push against the switch member 82 until the switch member 82 is released by its releasable holder 88. The tension member 84 may then pull the switch member 82 into the switch cavity 90, at which time the switch member 82 will electrically connect the conductors 85, 86 together. When the conductors 85, 86 are electrically connected together, then the ac input terminals 12, 20 will also be electrically connected together.

Alternatively, the fault control device 22 may be any suitable electrical, electrical/mechanical, electronic, or electronic/mechanical fault control device 22 that is normally closed (i.e., that is normally conductive), and that is wired in series with the primary winding 26a of the transformer 26 at a location selected to prevent any of the ac power from the source 15 from reaching the components 23-26 once the fault control device 22 has reached its predetermined high temperature limit and has been permanently opened. For example, such a fault control device 22 may be any suitable thermal fuse that is normally conductive, but that is permanently opened once it reaches its predetermined high temperature limit.

Of course, unless the fault control device 22 is triggered it has no effect on the normal operation of the power supply 10.

The Transient Current Suppression (TCS) Device 23:

Any suitable TCS device 23 may be used to suppress the flow of a transient current surge though the high impedance device 16 which may be caused, for example, by a high voltage pulse due to a lightening strike on the high voltage power line that acts as the ac source 15. The TCS device 23 may comprise, for example, a small value, non-inductive resistor or resistors in series that may be selected to endure such a high voltage pulse for very short period of time. Of course, the TCS device has no effect on the normal operation of the power supply 10 when the power supply 10 is not subjected to a transient current surge caused by a high voltage pulse.

The Transient Voltage Suppression (TVS) Device 24:

Any suitable TVS device 24 may be used such as, for example, any suitable varistor, zener diode, dual zener diode, TVS diode (commonly known as a transorb), or spark gap. The functions of the TVS device 24 may include protecting the ac switch 25 and the primary winding 26a of the transformer 26 from damage that may otherwise be caused by transient voltage peaks such as may be caused, for example, by a lightening strike on the high voltage power line that acts as the ac source 15. When the TVS device 24 is activated, it may provide a shunt across the inputs for the ac switch 25 and primary winding 26a of the transformer 26. Of course, unless the TVS device 24 is triggered it has no effect on the normal operation of the power supply 10.

The Ac Switch 25:

Any suitable electrical, electrical/mechanical, electronic, or electronic/mechanical ac switch 25 may be wired in parallel with the primary winding 26a of the transformer 26 to selectively provide a shunt across the primary winding 26a when it is closed (i.e., when it is on), and to selectively cease to provide that shunt when it is open (i.e., when it is off). In other words, the ac switch 25 may be operable to selectively prevent and permit a receipt by the rectifier 64 of at least some of the secondary winding ac output current from the secondary winding 26b of the power transformer 26 by selectively shunting, or not shunting, the primary winding 26a. The ac switch 25 may be operable to periodically open and close as a function of driver control signals it receives from the driver 30.

Figure 3:
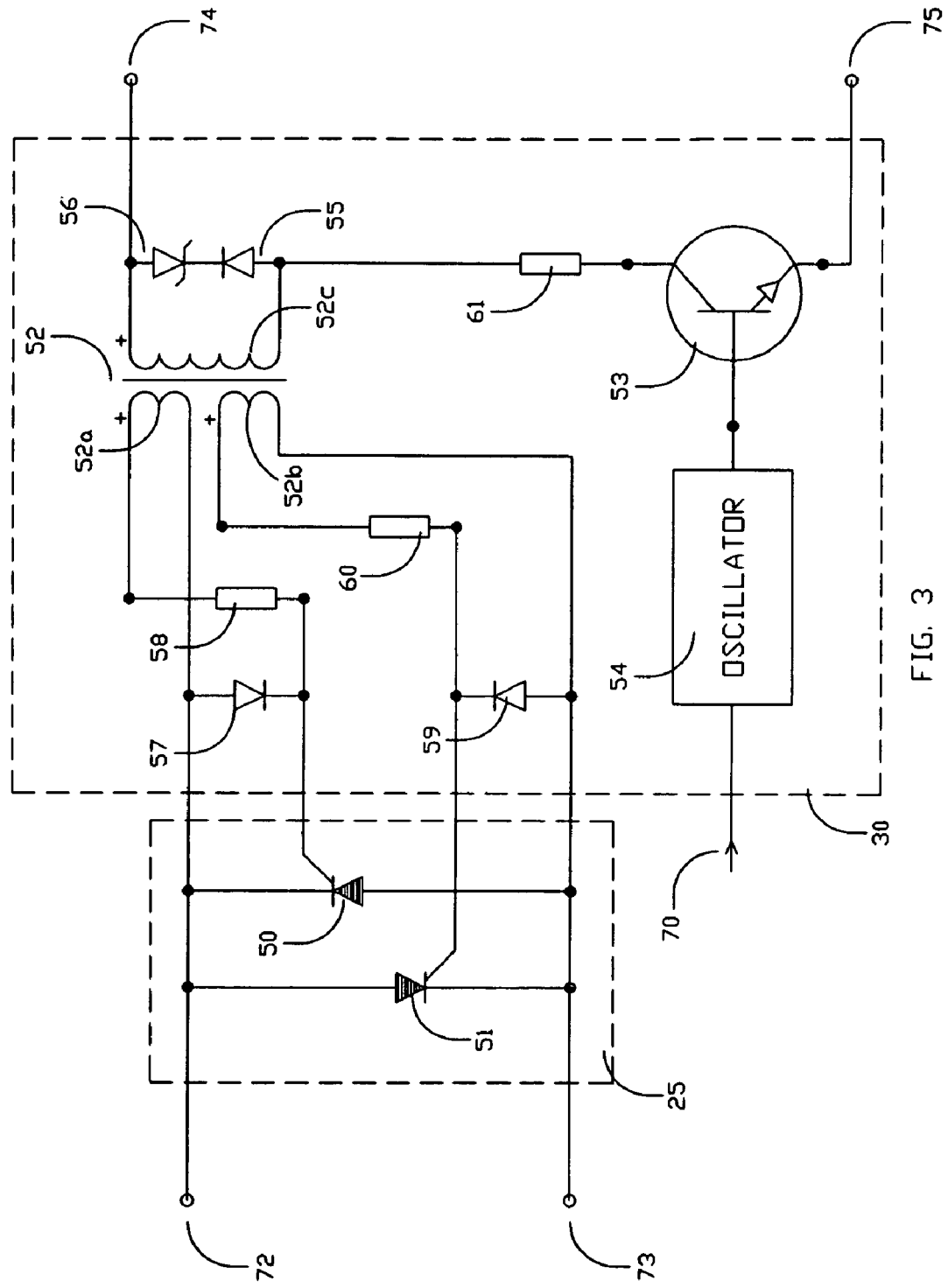
FIG. 3 is a schematic diagram of the ac switch 25 and driver 30 seen in FIG. 1.

By way of example, the electronic ac switch 25 illustrated in FIGS. 1 and 3 may be used, which may comprise a pair silicon controlled rectifiers (SCRs) 50, 51, also known as thyristors, that are connected in antiparallel, i.e., the two SCRs 50, 51 are connected in parallel but with their respective polarities reversed. As will be explained in more detail below, driver control signals generated by the driver 30 as a function of controller control signals 70 received by the driver 30 from the controller 31 may cause the ac switch 25 to close and open. Thus, this is an example of where the closing and opening of the ac switch 25 is indirectly controlled by the control signals 70 generated by the controller 31, since the driver 30 acts as an intermediary between the controller 31 and the ac switch 25.

Alternatively, the separate driver 30 may be eliminated, or incorporated as part of the controller 31, in which the closing and opening of the ac switch 25 may be controlled directly by controller control signals 70 generated by the controller 31.

As an alternative to the electronic ac switch 25 described above, any other suitable electronic ac switch 25 may be used, such as one comprising a triode for alternating current (Triac).

The Power Transformer 26:

The power transformer 26's primary winding 26a may convert a primary winding ac input voltage that it receives from the ac source 15 into a secondary winding ac output current.

Any suitable power transformer 26 may be used, and may be selected to be a voltage step-down type of transformer 26 so that its turns ratio (i.e., the ratio of the number of turns of its primary winding 26a to the number of turns of its secondary winding 26b) is relatively large, to increase the current passing through its secondary winding 26b. The needed turns ratio of the transformer 26 may be calculated based on the desired maximum continuous current output capacity of the power supply 10. In general, the needed turns ratio is a function of the desired maximum continuous current output capacity of the power supply 10, and will increase as the desired maximum continuous current output capacity of the power supply 10 increases, and vice versa. The secondary winding 26b may, or may not, be center-tapped.

The Low Voltage Side of Converter 18:

The low voltage side or secondary-side of the converter 18 may comprise the secondary winding 26b of the transformer 26; any suitable rectifier 64 connected in parallel with the secondary winding 26b; any suitable driver 30, any suitable controller 31, any suitable dc switch 62, and any suitable regulator 66 connected in parallel with the output of the rectifier 64; any suitable diode device 65 connected in series between the positive output end of the rectifier 64 and the controller 31; and any suitable input and an output filter capacitors 67, 68 connected in parallel, respectively, with the input and output ends of the regulator 66.

In addition, dc power for the various components in the controller 31 and driver 30 may be provided by wires 76, 77, 78 to convey dc voltage from the output of the regulator 66 to the driver 30 and the controller 31. The wires 76, 77, 78 are not shown in FIGS. 2-3 for clarity, since it would be apparent to any person of ordinary skill in the art how to provide any suitable source of dc power to the various components of the driver 30 and the controller 31.

As an overview of the operation of the low voltage side of the converter 18, the controller 31 may send controller control signals 70 to the driver 30 and to the dc switch 62. The controller control signals 70 may tell the driver 30 to generate driver control signals to tell the ac switch 25 when to close and open. The controller control signals 70 may also tell the dc switch 62 when to close and open.

The Rectifier 64 and Diode Device 65:

By way of example, a full wave bridge rectifier 64 is illustrated in FIG. 1. However, any other suitable rectifier 64 may be used that is compatible with the voltage and current handling requirements of the low voltage side of the converter 18, such as any suitable full wave or half wave rectifier 64 connected in any suitable way to the secondary winding 26b of the power transformer 26. The secondary winding 26b may, or may not, be center-tapped.

Any suitable diode device 65 may be connected in series with the positive output end of the rectifier 64 to prevent a reverse flow of dc current from the controller 31's high capacitance device 43 to the DC switch 62 when it's closed.

The DC Switch 62:

The dc switch 62 may be operable to selectively permit and prevent a receipt by the controller 31 of at least some of the dc output current from the rectifier 64. The dc switch 62 may be operable to periodically open and close as a function of the controller control signals 70 generated by the controller 31. While the dc switch 62 is closed, it may be operable to prevent a receipt by the controller 31 of at least some of the dc output current from the rectifier 64.

Figure 4:
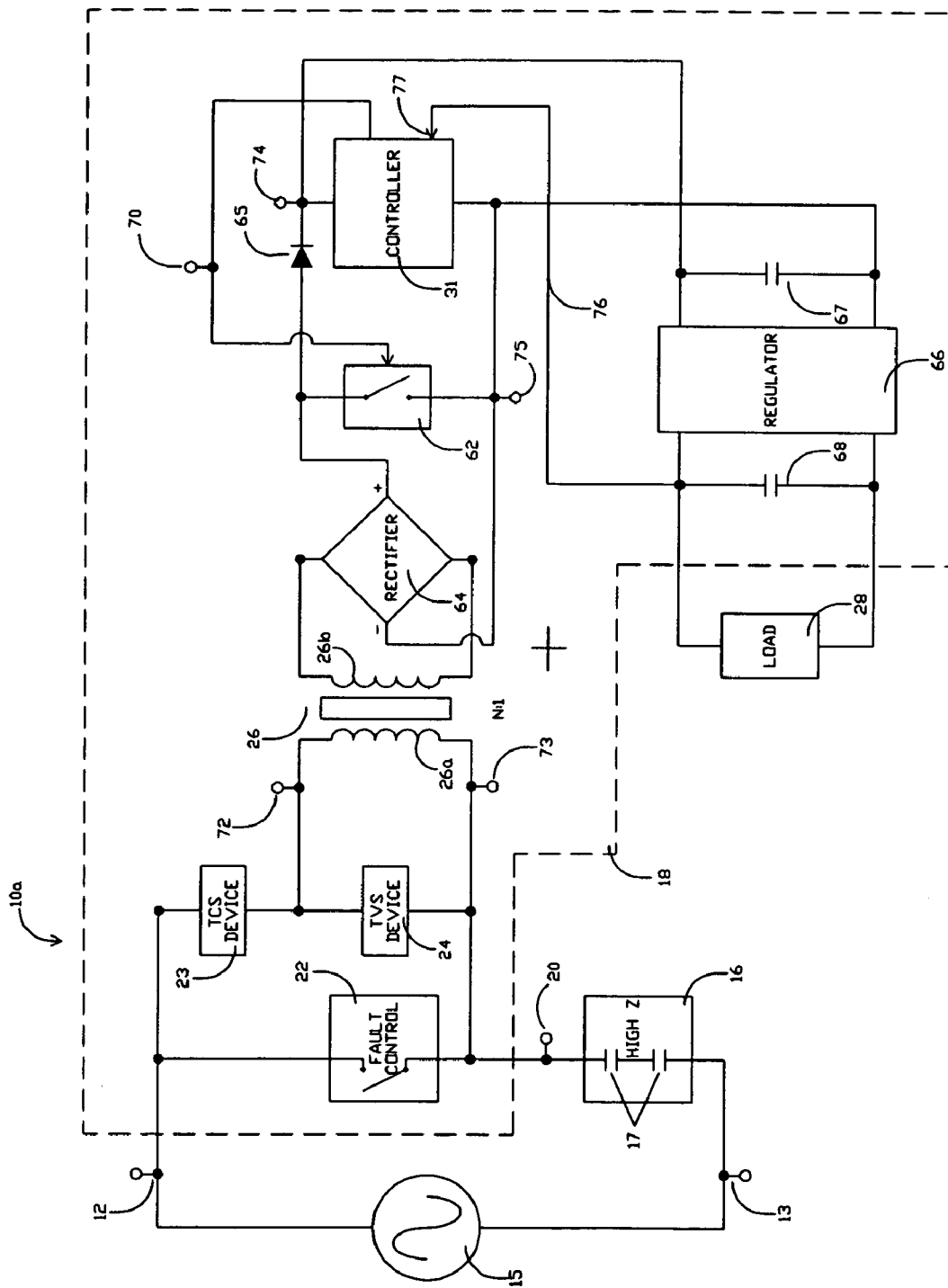
FIG. 4 is a schematic diagram of an alternate embodiment of an impedance dropping dc power supply 10a having an impedance controlled converter 18.

Any suitable electrical, electrical/mechanical, electronic, or electronic/mechanical dc switch 62 may be wired in parallel with the output of the rectifier 64 to selectively provide a shunt across the output of the rectifier 64 when it is closed (i.e., when it is on), and to selectively cease to provide that shunt when it is open (i.e., when it is off). The closing and opening of the dc switch 62 may be controlled directly or indirectly by controller control signals 70 generated by the controller 31. By way of example, the dc switch 62 that is illustrated in FIGS. 1 and 4, is controlled directly by control signals 70 generated by the controller 31.

It may be noted that even when the driver 30 sends driver control signals to trigger the ac switch 25 to close, the ac switch 25 may not act as a perfect shunt, in which case a small leakage current may flow through the primary winding 26a of the transformer 26 which will, in turn, cause a corresponding leakage current to flow through the secondary winding 26b. The leakage current in the secondary winding 26b may then be rectified by the rectifier 64 and flow to the driver 30, where it may cause an over voltage failure of the SCRs 50, 51 in the ac switch 25. This is because that leakage current may interfere with the holding current and positive voltage triggering mechanism of the SCRs 50, 51 and prevent them from triggering in time after they receive their respective driver control signals (triggering signals) from the driver 30.

However, because the control signals 70 from the controller 31 cause the dc switch 62 to close at the same time the ac switch 25 closes, any leakage current from the rectifier 64 when the ac switch 25 is closed is shunted by the dc switch 62, thereby preventing the leakage current from reaching the SCRs 50, 51 of the ac switch 25 and possibly causing an over voltage failure of the SCRs 50, 51.

Nevertheless, as an alternative, the dc switch 62 may be eliminated, such as where more robust SCRs 50, 51 are used, or where an ac switch 25 is selected to be used that does not permit a leakage current to flow through the primary winding 26a of the transformer 26 when the driver control signals trigger it to close.

The Controller 31:

Any suitable controller 31 may be used to generate the control signals 70 for the driver 30, and for the dc switch 62 as a function of the impedance of the load 28. Any suitable controller 31 may be used, such as the controller 31 illustrated in FIG. 2, which may comprise any suitable Schmidt trigger circuit 32, any suitable voltage divider 39; any suitable voltage reference 42; any suitable high capacitance device 43; and any suitable voltage clamping device 49.

The voltage clamping device 49 may comprise, for example, any suitable varistor 46, zener diode 46, or TVS diode 46. The functions of the voltage clamping device 49 may include protecting the other components of the controller 31 from damage that may otherwise be caused by transient voltage peaks such as may be caused, for example, by a lightening strike on the high voltage power line that acts as the ac source 15. When the voltage clamping device 49 is activated, it may keep the voltage across the terminals 74, 75 clamped. Of course, unless the voltage clamping device 49 is triggered it has no effect on the normal operation of the controller 31.

The voltage divider 39 may comprise, for example, a pair of any suitable resistors 40, 41.

The high capacitance device 43 may comprise a single capacitor 44 or 45; two or more capacitors 44, 45 connected in parallel; a single capacitor string that comprises two or more capacitors 44, 45 that are connected in series; or two or more such capacitor strings that are connected in parallel. The discharge rate of the high capacitance device 43 may be at least partially a function of the impedance of the load 28.

The functions of the Schmidt trigger circuit 32 may include generating the controller 31's controller control signals 70 for the driver 30 and for the dc switch 62 as a function of the impedance of the load 28. In general, the frequency of the controller control signals 70 generated by the Schmidt trigger circuit 32 may increase as the impedance of the load 28 decreases, and vice versa.

Figure 2:
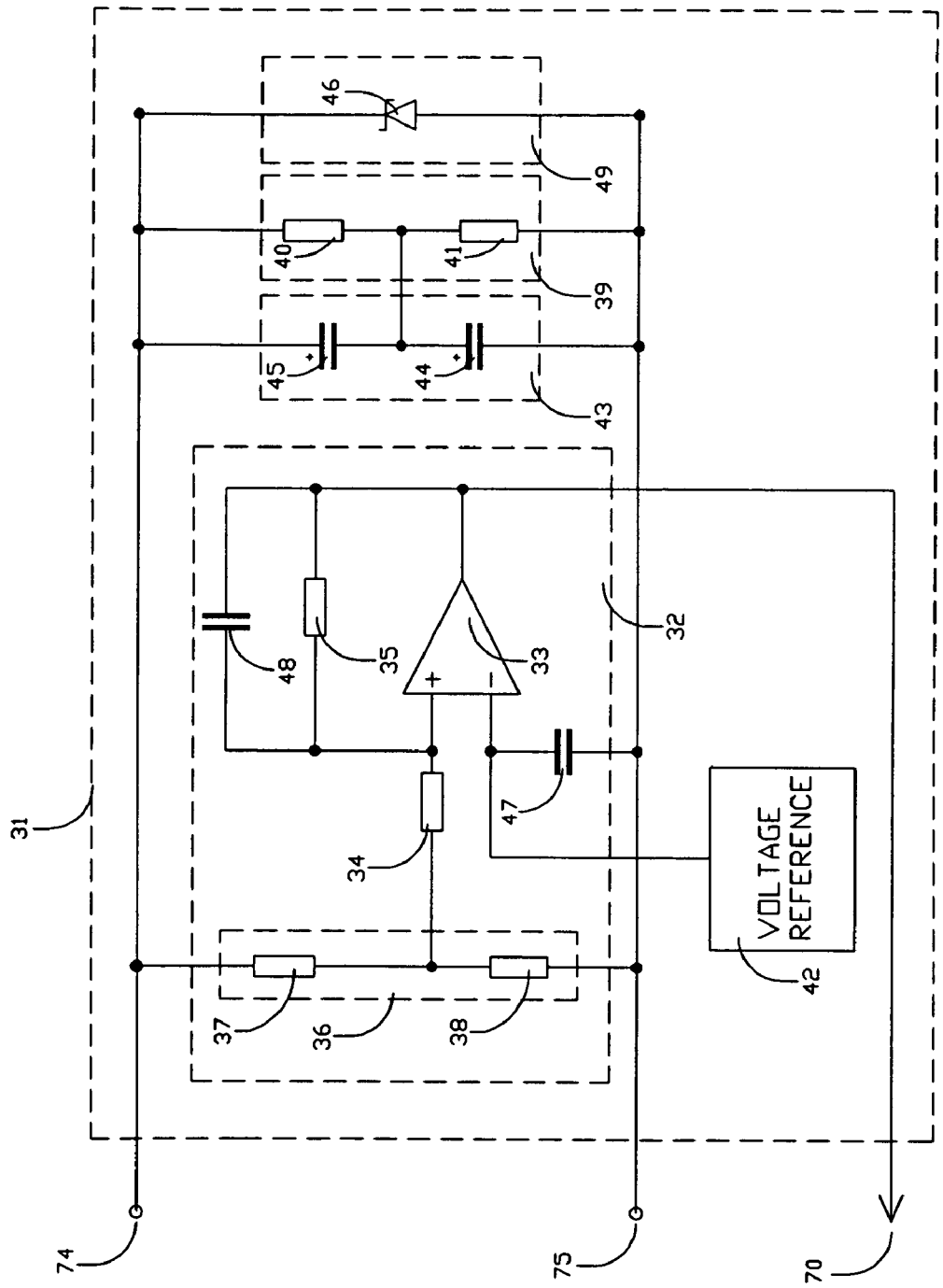
FIG. 2 is a schematic diagram of the controller 31 seen in FIG. 1.

The Schmidt trigger circuit 32 may comprise any suitable Schmitt-like trigger circuitry, such as the Schmidt trigger 32 that is illustrated in FIG. 2, which may comprise any suitable comparator 33; a pair of any suitable feedback resistors 34, 35; any suitable voltage divider 36; and a pair of any suitable capacitors 47, 48. The comparator 33 may be connected so as to have positive feedback. The capacitors 47, 48 may be used to suppress high frequency noise, in order to prevent such noise from miss-triggering the Schmidt trigger 32. The voltage divider 36 may comprise, for example, a pair of any suitable resistors 37, 38.

The Schmidt trigger 32's upper limit voltage may be selected to meet the requirements of not exceeding the rated voltage for the secondary winding 26b of the power transformer 26, and of not exceeding the maximum allowed input voltage of the voltage regulator 66, in order to avoid damage to the transformer 26 and the regulator 66. Any upper limit voltage may be selected for the Schmidt trigger 32, as long as that upper limit voltage meets the above requirements.

The Schmidt trigger 32's lower limit voltage may be selected to be not less than the minimum allowed input voltage to the regulator 66, for proper operation of the regulator 66. The lower limit voltage may affect the frequency of the controller control signals 70 that it generates which will, in turn, affect the switching frequency of the ac switch 25 and the dc switch 62.

As an alternative to the Schmidt trigger 32 in FIG. 2, any other suitable Schmidt-like circuitry may be used that performs its needed functions, such as any suitable microcontroller based Schmidt circuitry.

The Driver 30:

Any suitable driver 30 may be used to generate driver control signals as a function of the controller control signals 70 that the driver 30 may receive from the controller 31. In turn, the ac switch 25 may be operable to periodically open and close as a function of the driver control signals it receives from the driver 30.

For example, the driver 30 of FIG. 3 may be used, which may comprise a transformer 52 having connected to its primary winding 52c any suitable dc switch 53, any suitable oscillator 54, any suitable resistor 61, any suitable zener diode 55, and any suitable diode 56. The driver 30 may further comprise any suitable diode 57 and resistor 58 connected to a first secondary winding 52a of the transformer 52, and any suitable diode 59 and any suitable resistor 60 connected to a second secondary winding 52b of the transformer 52.

The transformer 52 may serve the purpose of providing galvanic isolation between the controller 31 and the ac switch 25, in which case the driver 30 may be a called a galvanic isolation driver 30. The transformer 52 may comprise any suitable transformer such as any suitable pulse transformer 52 having one primary winding 52c and two secondary windings 52a, 52b. The two secondary windings 52a, 52b of the transformer 52 may be used to separately trigger the gates of SCRs 50, 51. The primary winding 52c may be driven by a dc switch 53 and an oscillator 54 that is controlled by the controller control signals 70 that it receives from the controller 31.

The resistor 61 may be used to limit the pulse current from the dc switch 53 to the primary winding 52c of the pulse transformer 52.

The diodes 55, 56 may together form a "snubber". In a situation where current to the primary winding 52c of the pulse transformer 52 is rapidly interrupted, a large voltage spike would be produced in the reverse direction as the primary winding 52c attempts to keep current flowing in the circuit. This voltage spike is known as an inductive kick. Placing the snubber diodes 55, 56 in parallel with the primary winding 52c allows the current from the primary winding 52c to flow through the diodes 55,56, rather than through the switch 53, thereby protecting the switch 53 from the voltage spike.

The diodes 57 and 59 may be used to prevent the gates of the SCRs 50, 51 from reverse gate voltage damage. The resistors 58, 60 may be used to limit the peak gate current of the SCRs 50, 51.

The Voltage Regulator 66:

Any suitable voltage regulator 66 may be used to provide any desired output voltage to the load 28; and may be, for example, any suitable linear voltage regulator or any suitable switching voltage regulator. Any suitable input and output filter capacitors 67, 68 may be connected in parallel with, respectively, the input and output of the regulator 66, to provide any desired filtering for the regulator 66.

The Operation of the Power Supply 10:

Referring now to FIGS. 1-3, if the input impedance of the converter 18 at its input terminals 12, 20 reaches a certain "threshold value", then the Schmitt trigger 32 will be automatically triggered and the power supply 10's following feedback process will begin to operate. This "threshold value" will be explained below.

During operation of the power supply 10 the high capacitance device 43 of the controller 31 is charged by drawing current from the rectifier 64, thereby increasing the voltage across the high capacitance device 43, and causing a corresponding increase in the input voltage to the controller 31's Schmitt trigger 32. When the input voltage increases beyond the Schmitt trigger 32's upper limit voltage, the output voltage of the Schmitt trigger 32 goes from a low level voltage signal to high level voltage signal.

The high level voltage signal from the Schmitt trigger 32 acts as a high level voltage controller control signal 70 for the driver 30's oscillator 54 and for the dc switch 62.

With respect to the driver 30, the high level voltage controller control signal 70 from the Schmitt trigger 32 turns on the driver 30's oscillator 54, which then periodically triggers the driver 30's dc switch 53. The dc switch 53 then provides a periodic pulse train to the primary winding 52c of the driver 30's pulse transformer 52. Each of the secondary windings 52a, 52b of the pulse transformer 52 then generates a respective periodic pulse train that is sent to its respective SCR 50, 51 in the ac switch 25. This causes the SCRs 50, 51 to switch on (i.e., to close) and shunt the primary winding 26a of the power transformer 26.

At this time the ac switch 25 may be operable to selectively prevent a receipt by the rectifier 64 of at least some of the ac output current from the secondary winding 26b of the power transformer 26 by shunting the primary winding 26a and preventing all of the ac input current from entering the primary winding 26a, aside from a small ac leakage current that may occur due to the nature of the SCRs 50, 51. As has been mentioned, this small ac leakage current may then induce a corresponding ac leakage current in the secondary winding 26b of the transformer 26 which may then cause a corresponding dc leakage current from the rectifier 64.

At the same time that the ac switch 25 closes, the high level voltage controller control signal 70 from the controller 31's Schmitt trigger 32 also causes the dc switch 62 to close and shunt any dc leakage current from the rectifier 64. As a result of the operation of the ac switch 25 and the dc switch 62, at this time the dc input voltage and dc input power from the rectifier 64 to the driver 30, controller 31 and regulator 66 are essentially zero. If no dc input power is supplied to the driver 30, controller 31, dc switch 62 and regulator 66, one would normally expect that the power supply 10 would cease functioning and no longer supply power to the load 28.

However, at this time the controller 31's charged high capacitance device 43 begins to provide electrical energy (dc power) to the voltage regulator 66 that, in turn, continues to provide electrical energy (dc power) to the load 28. In addition, at this time the controller 31's charged high capacitance device 43 also begins to provide electrical energy (dc power) to the ac switch 25, driver 30, controller 31, Schmidt trigger 32, and dc switch 62, to maintain all of the power supply 10's necessary switching operations. As the high capacitance device 43 is discharged, the voltage across it decreases, thereby decreasing the input voltage to the controller 31's Schmitt trigger 32. When the input voltage to the Schmitt trigger 32 decreases below its lower limit voltage, its output voltage signal flips from its high level voltage signal to its low level voltage signal.

The low level voltage signal from the controller 31's Schmitt trigger 32 acts as a low level voltage controller control signal 70 for the dc switch 62 and for the driver 30's oscillator 54. The low level voltage controller control signal 70 causes the dc switch 62 to open and cease shunting the dc current from the output of the rectifier 64.

Simultaneously, the low level voltage controller control signal 70 from the controller 31's Schmitt trigger 32 also turns the driver 30's oscillator 54 off, so that it no longer periodically triggers the driver 30's dc switch 53. The dc switch 53 then ceases to provide a periodic pulse train to the primary winding 52c of the driver 30's pulse transformer 52. As a result, the secondary windings 52a, 52b cease to generate a periodic pulse train to the ac switch 25's SCRs 50, 51, which causes them to switch off, so that the ac switch 25 no longer shunts the primary winding 26a of the transformer 26. This enables the transformer 26 to again supply power to the rectifier 64, so that the output power from the rectifier 64 may start charging the controller 31's high capacitance device 43 again. Then the power supply 10's above feedback process automatically repeats itself over and over again.

In the power supply 10's above feedback process, the rate at which the controller 31's high capacitance device 43 is charged, and the rate at which is its discharged, (i.e., the frequency at which the feedback process repeats itself), may be governed by any applicable factors, such as the impedance of the load 28, the upper and lower limit voltages of the controller 31's Schmitt trigger 32, and the RC (resistor/capacitor) network formed by the controller 31's high capacitance device 43 and voltage divider 39.

In addition, in the power supply 10's above feedback process, the average input impedance of the converter 18 and the maximum output power of the power supply 10 to the load 28 are a function of the impedance of the load 28 and the upper limit voltage of the controller 31's Schmitt trigger 32. Through the repetition of the power supply 10's above feedback process, the average input impedance of the converter 18 may be controlled so that it adaptively changes as a function of the impedance of the load 28.

In particular, once the input impedance of the converter 18 at its input terminals 12, 20 has reached a certain threshold value determined by the Schmidt trigger 32's upper limit voltage, the converter 18 may be operable to: (a) adaptively decrease the average input impedance of the converter 18 as the impedance of the load 28 increases, (b) adaptively increase the average input impedance of the converter 18 as the impedance of the load 28 decreases; (c) adaptively decrease the average input power to the converter 18 as the impedance of the load 28 increases, (d) adaptively increase the average input power to the converter 18 as the impedance of the load decreases; (e) adaptively decrease the ac input voltage across the primary winding 26 of the power transformer 26 as the impedance of the load 28 increases; and (f) adaptively increase the ac input voltage across the primary winding 26 as the impedance of the load decreases.

One net result is that the converter 18 is operable to keep the ac input voltage across the primary winding 26a of the power transformer 26 at a voltage that is less than a predetermined maximum voltage, i.e., at a voltage that is less than would otherwise be the case if the power supply 10 did not have a converter 18.

In particular, the converter 18 may be designed to be operable to keep the ac input voltage across the primary winding 26a of its power transformer 26 at a voltage which is: (a) less than about 600 V ac, (b) less than about 1 kV ac, (c) less than about 2 kV ac, (c) less than about $1/10^{th}$ of the ac input voltage from the ac source 15 across its input terminals 12, 13, or (d) in the range of from less than about ½ to less than about $1/10^{th}$ of the ac input voltage from the ac source 15 across its input terminals 12, 13.

Accordingly, as a result of having a converter 18, the power supply 10 may then offer the benefits of being smaller in size, lighter in weight, and less in cost than would be the case if the power supply 10 did not have a converter 18. This is because the converter 18 enables the power supply 10 to utilize a power transformer 26 having a primary winding 26a that has a maximum rated operating voltage that is lower than would be the case if the power supply 10 did not have a converter 18.

In general, a power transformer 26 having a primary winding 26a with a higher maximum rated operating voltage will be larger in size, heavier, and cost more than a power transformer 26 having a primary winding 26a with a lower maximum rated operating voltage, with the size, weight and cost of the power transformer 26 increasing more and more as the maximum rated operating voltage of its primary winding 26a increases more and more.

For example, for a power transformer 26 having a primary winding 26a with a maximum rated operating voltage of 1 kV, or less, its size may be on the order of about several inches in each dimension; its weight may be less than about three pounds; and its cost may be less than several tens of dollars.

On the other hand, for a power transformer 26 having a primary winding 26a with a maximum rated operating voltage of at least 2 kV, such as 14 kV or more, its size may be on the order of about several feet in each dimension, or more; its weight may in the range of several tens of pounds to hundreds of pounds, or more; and its cost may be in the range of hundreds of dollars to thousands of dollars, or more.

Repetition of the power supply 10's above feedback process results in the average input ac power to the power supply 10's converter 18 being very close to the average dc power delivered to the load 28. This is because the ac switch 25 may reduce to a negligible level the copper loss of the transformer 26 and the power loss of the dc switch 62, thereby reducing the amount of the power loss (i.e. waste heat) generated by the converter 18, since little or no power passes through the transformer 26 and dc switch 62 while the ac switch 25 is closed.

An Example Power Supply 10

An example power supply 10 will now be described which has the following electrical parts list.

| REF. NO. | DEVICE NAME | VALUE or PART NUMBER/MANUFACTURER |
|---|---|---|
| 17 | Capacitors (two in parallel) | Each is 3,300 pF, 20 kV rms |
| 22 | Fault control device | F11090151ZA0060/Cantherm of Montreal, Canada |
| 23 | Resistor | 200 Ω |
| 24 | Transorb | 1V5KE400(C)A/Fairchild Semiconductor of San Jose, Cal. |
| 26 | Power Transformer | 70060/Amveco Magnetics of Houston, Texas |

-continued

| REF. NO. | DEVICE NAME | VALUE or PART NUMBER/MANUFACTURER |
|---|---|---|
| 33 | Comparator, low voltage | LMV331/Texas Instruments of Dallas, Texas |
| 34 | Resistor | 100 Ω |
| 35 | Resistor | 300 kΩ |
| 37 | Resistor | 20 kΩ |
| 38 | Resistor | 12.1 kΩ |
| 40, 41 | Resistor | 1 MΩ |
| 42 | Voltage reference | LT1790AIS-2.50/Linear Technology of Milpitas, California |
| 44, 45 | Capacitors (two in series) | Each 3.3-4.2 F, 5.5 V dc |
| 46 | Zener, Small Outline Diode (SOD) package | 12 V |
| 47 | Capacitor | 100 pF |
| 48 | Capacitor | 100 nF |
| 50, 51 | SCR, sensitive gate | S6010DS2/Littelfuse of Des Plaines, Illinois |
| 52 | Pulse transformer | TR1_632C/Hammond Manufacturing of Cheektowaga, NY |
| 53 | Transistor, control | 2SK2858/NEC of Irving, Texas |
| 54 | Oscillator | ICM7555ID/NXP Semiconductor of Eindhoven, The Netherlands |
| 55 | Diode, snub | B240A-13-F/Diodes Incorporated of Dallas, Texas |
| 56 | Diode, zener | 12 V |
| 57, 59 | Diode, Schottky | B240A-13-F/Vox Technologies |
| 58, 60 | Resistor | 10 Ω |
| 61 | Resistor | 400 Ω |
| 62 | Switch, dc (insulated gate, bipolar transistor (IGBT)) | STGB10NB40LZ/STMicroelectronics of Geneva, Switzerland |
| 64 | Rectifier, bridge | Made from diodes # B240A-13-F/Diodes Incorporated of Dallas, Texas (DIODES INC) |
| 65 | Diode | B240A-13-F/Diodes Incorporated of Dallas, Texas (DIODES INC) |
| 66 | Voltage Regulator | TPS62112/Texas Instruments of Dallas, Texas |
| 67 | Capacitor | 44 µF (ceramic) in parallel with 1,000 µF (aluminum) |
| 68 | Capacitor | 66 µF |

Operating Parameters of the Example Power Supply 10:

The above example power supply 10 may have the following operating parameters: (a) the input voltage range from the ac source 15 is 8 kV rms to 14 kV rms at 60 cps (cycles per second); (b) the turns ratio of power transformer 26 is 30:1; (c) the secondary side ac current to dc current conversion ratio of the converter 18, i.e., the ac current to dc current conversion ratio of its rectifier 64, capacitors 44, 45 and regulator 66 is 0.9; (d) the maximum continuous output current of power supply 10 to load 28 is 800 mA when ac input voltage is 14 kV, and is 400 mA when ac input voltage is 8 kV; (e) the dc output voltage of power supply 10 to the load 28 is 5 V dc; (f) the maximum continuous power output of the power supply 10 to the load 28 is 4 watts when the ac input voltage is 14 kV, and is 2 watts when the ac input voltage is 8 kV; (g) the minimum impedance of load 28 is 6.25Ω when the ac input voltage is 14 kV, and is 12.5Ω when the ac input voltage is 8 kV; (h) the upper limit voltage of the Schmidt trigger 32 is 6.5V; and (i) the heat dissipation of the power supply 10 may be in the range of about 30 mW to about 300 mW.

Variations of the Power Supply 10:

In general, the various applicable operating parameters of the power supply 10 may be adjusted up, or down, to meet the needs of any particular user of the power supply 10.

Some of the various applicable variables that may affect one or more of the various operating parameters of the power supply 10 will now be addressed.

The power supply 10's designed maximum continuous dc output current to the load 28 may be selected based on such variables as, for example, the designed maximum dc output voltage to the load 28 and the designed minimum impedance of the load 28.

The total capacitance of the input capacitors 17 may be selected based on such variables as, for example, the designed maximum continuous dc output current to the load 28; the designed average input impedance range of the converter 18 at its input terminals 12, 20 once the input impedance of the converter 18 at its input terminals 12, 20 has reached a certain "threshold value", the secondary side ac current to dc current conversion ratio of the converter 18, the turns ratio of the power transformer 26, the maximum ac input voltage to the terminals 12, 13, and the frequency of the ac input voltage to the terminals 12, 13. In general, an increase in the total capacitance of the input capacitors 17 may result in an increase in the designed maximum continuous dc output current to the load 28, and vice versa.

For example, if the maximum continuous dc output current to the load 28 ($I_{load}$) is selected to be 800 mA, and if the input voltage to the terminals 12, 13 ($V_{input}$) is selected to be 14 kV at a frequency (0 of 60 cps, then a simplified estimation of the needed total capacitance of the input capacitors 17 (C) may be done as follows.

If the secondary side ac to dc conversion ratio the converter 18 is 0.9, then the ac current passing through the transformer 26's secondary winding 26b is equal to 800 mA/0.9=889 mA. If the transformer 26's turns ratio is 30:1, then the ac current passing though the transformer 26's primary winding 26a ($I_{transformer\_primary}$) is equal to 889 mA/30=29.63 mA. Accordingly, C may be calculated as:

$$C = \frac{I_{transformer\_primary}}{V_{input} \times 2\Pi f} = \frac{.02963}{14,000 \times 376.8} = 5.6 \ln F$$

The power supply 10 may have any desired designed range of $V_{input}$ applied to its input terminals 12, 13. The input capacitors 17 may be arranged in series or in parallel, and their ac voltage ratings may be selected based on the highest desired $V_{input}$ at terminals 12, 13.

The power supply 10's designed output dc voltage to the load 28 may be obtained by suitably selecting the voltage regulator 66, which may be, for example, a linear regulator, a switching buck regulator, a switching boost-buck regulator, or a switching boost regulator. For example, if the power supply 10's rated output dc voltage is less than the Schmidt trigger 32's upper limit voltage, a linear regulator or a switching buck regulator may be a suitable choice. On the other hand, if its rated output dc voltage is larger than the Schmidt trigger 32's upper limit voltage, then a switching boost regulator may be selected.

The power supply 10's designed impedance range for the load 28 may be from its lowest rated (allowed) impedance for the load 28 up to an impedance for the load 28 that is infinity (i.e., up to the load 28 being an open circuit). The power supply 10's lowest rated impedance for the load 28 may be selected based on such variables as, for example, the turns ratio of the power transformer 26 (N) and the total capacitance of the input capacitors 17 (C). In general, as N or C is increased, the lowest rated impedance for the load 28 will decrease, and vice versa.

When the impedance of the load 28 is very small (such as in the low end of the power supply 10's rated impedance range for the load 28), then the input impedance of the converter 18 at its input terminals 12, 20 will increase as the impedance of the load 28 increases until the input impedance of the converter 18 reaches a "threshold value" that is be determined by the upper limit voltage of the Schmidt trigger 32 in the controller 31 (explained below in more detail). However, once the input impedance of the converter 18 has reached this threshold value, any further increase of the impedance of the load 28 will make the average input impedance of the converter 18 at its input terminals 12, 20 decrease, and vice versa, due to the way the average input impedance of the converter 18 automatically adjusts as a function of the impedance of the load 28.

In general, once the input impedance of converter 18 at its input terminals 12, 20 has reached its threshold value any further increase in the impedance of the load 28 will result in the ac switch 25 and the dc switch 62 staying closed longer, resulting in the average input impedance of the converter 18 at its input terminals 12, 20 adaptively decreasing as the impedance of the load 28 increases, and vice versa.

In addition, in general, due to the operation of the power supply 10's converter 18, once the input impedance of converter 18 has reached its "threshold value", any further increases in the converter 18's average input impedance at its input terminals 12, 20 will result in corresponding increases in the ac input voltage across its terminals 12, 20, the input power to the converter 18, and the output power of the converter 18 to the load 28, and vice versa.

Figure 5:
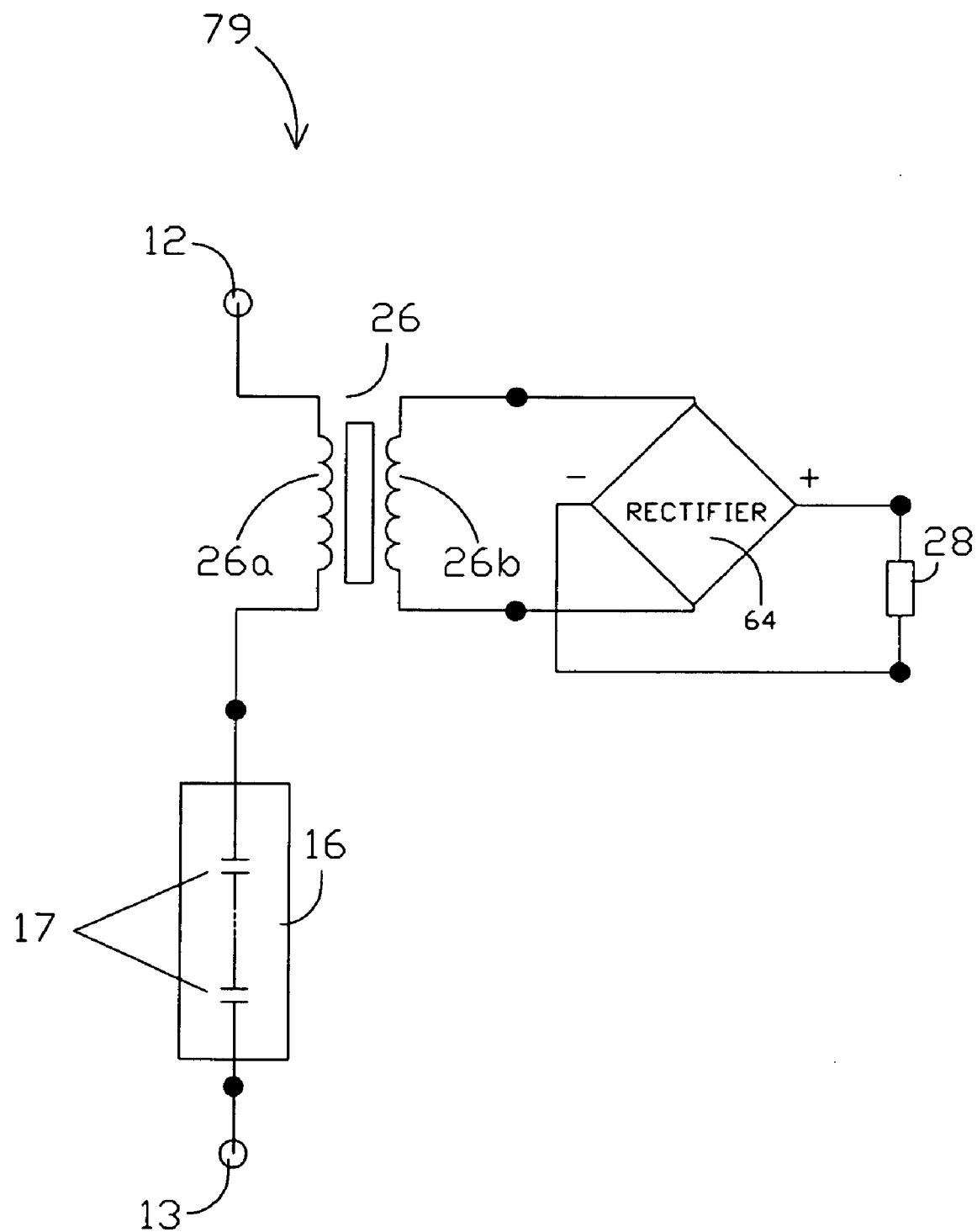
FIG. 5 is a schematic diagram of a simplified impedance dropping dc power supply 79.

FIG. 5 Power Supply 79—Calculation of $V_{primary\_winding}$ as a Function of $Z_{load}$:

Turning now to the impedance dropping power supply 79 of FIG. 5, let it be assumed that an ac input voltage ($V_{input}$) of 14 kV having a frequency (f) of 60 cps is applied across its input terminals 12, 13; that the turns ratio (N) of the primary winding 26a to the secondary winding 26b of the power transformer 26 is 30:1; and that, when measured, the high voltage capacitors 17 in its high impedance device 16 (which have a nominal total capacitance (C) of 6.6 nF) actually have a C=5.61 nF due to normal tolerance variations in such capacitors 17.

Regarding the FIG. 5 circuit, it is of interest to determine what effect varying the impedance of the load 28 ($Z_{load}$) has on the ac voltage across the primary winding 26a of the power transformer 26 ($V_{primary\_winding}$).

FIG. 5 Power Supply 79—Calculation of $V_{primary\_winding}$ as a Function of $Z_{load}$;

Case 1 ($V_{input}$=14 kV and $Z_{load}$=20Ω):

Let it be further assumed that $Z_{load}$=20Ω. Then $V_{primary\_winding}$ may be calculated in the following manner.

First, the impedance of the primary winding 26a of the power transformer 26 ($Z_{primary\_winding}$) may be calculated as:

$$Z_{primary\_winding} = Z_{load} \times N^2 = 20\Omega \times 30^2 = 18\ k\Omega$$

In addition, the total impedance of the high voltage capacitors 17 ($Z_c$) may be calculated as:

$$Z_c = \frac{1}{2\pi f C} = \frac{1}{2\pi \times 60 \times (5.61 \times 10^{-9})} = \frac{1}{2.1149 \times 10^{-6}} = 472.8 k\Omega$$

Accordingly, the current that passes through the primary winding 26a ($I_{primary\_winding}$) may be calculated as:

$$I_{primary\_winding} = \frac{V_{input}}{\sqrt{Z_c^2 + Z_{primary\_winding}^2}} = \frac{14kV}{\sqrt{472.8 k\Omega^2 + 18 k\Omega^2}} = 29.6 mA$$

Thus, when $Z_{load}$=20Ω, $V_{primary\_winding}$ may be calculated as:

$$V_{primary\_winding} = I_{primary\_winding} \times Z_{primary\_winding} = 29.6\ mA \times 18\ k\Omega = 532.8V$$

FIG. 5 Power Supply 79—Calculation of $V_{primary\_winding}$ as a Function of $Z_{load}$, Case 2 ($V_{input}$=14 kV and $Z_{load}$=200Ω); and Case 3 ($V_{input}$=14 kV and $Z_{load}$=∞Ω (Open Circuit)):

In a similar way, when it is assumed that $Z_{load}$=200Ω, then $V_{primary\_winding}$ may be calculated to be 4.98 kV; and when it is assumed that $Z_{load}$=∞Ω (an open circuit), then $V_{primary\_winding}$ may be calculated to be 14 kV (the full input voltage ($V_{input}$) across terminals 12, 13).

FIG. 1 Power Supply 10—Calculation of $V_{primary\_winding}$ as a Function OF $Z_{load}$ Turning now to the FIG. 1 circuit, it will now be determined what effect varying the impedance of the load 28 ($Z_{load}$) has on the ac input voltage across the primary winding 26a of the power transformer 26 ($V_{primary\_winding}$).

As was the case for the FIG. 1 circuit, let it be assumed that the ac input voltage across terminals 12, 13 ($V_{input}$) is 14 kV having a frequency (f) of 60 cps; that the turns ratio of the power transformer 26 (N)=30:1; that the combined capacitance (C) of the high voltage capacitors 17 is 5.61 nF; and that the total impedance of the high voltage capacitors 17 ($Z_c$)=472.8 kΩ.

Let it also be assumed that the upper limit voltage of the Schmitt trigger 32 is 6.5 V. In such a case, then the maximum ac voltage across the secondary winding 26b of the power transformer 26 ($V_{secondary\_winding\_max}$) will also be 6.5V, since it is approximately equal to the upper limit voltage of the Schmitt trigger 32. With the forgoing assumptions, $V_{primary\_winding}$ may be approximately calculated for various values of $Z_{load}$ as follows.

During operation of the power supply 10, when $V_{secondary\_winding\_max}$ reaches 6.5V, the power supply 10's above feedback process will close the ac switch 25 and the dc switch 62, thereby cutting off input power to the capacitors 44, 45 in the controller 31. Therefore, the maximum ac voltage across the primary winding 26a of the power transformer 26 ($V_{primary\_winding\_max}$) may be approximately calculated as:

$$V_{primary\_winding\_max} = V_{secondary\_winding\_max} \times N = 6.5V \times 30 = 195V$$

The maximum current passing through the converter 18's input terminals 12, 20 ($I_{converter\_input\_max}$), may be calculated as:

$$I_{converter\_input\_max} = \frac{\sqrt{V_{input}^2 - V_{primary\_winding\_min}^2}}{Z_c} \approx \frac{\sqrt{(14kV)^2 - (0V)^2}}{472.8 k\Omega} = 29.6 mA$$

where $V_{primary\_winding\_min}$ is the minimum possible voltage across the primary winding 26a.

Similarly, the minimum current passing through the terminals 12, 20 ($I_{converter\_input\_min}$) may be calculated as:

$$I_{converter\_input\_min} = \frac{\sqrt{V_{input}^2 - V_{primary\_winding\_max}^2}}{Z_c} \approx \frac{\sqrt{(14\text{kV})^2 - (195V)^2}}{472.8 k\Omega} = 29.6 \text{mA}$$

It is noted that $I_{converter\_input\_max}$ and $I_{converter\_input\_min}$ are essentially constant. This is because in the above equations, $V_{primary\_winding\_min}$ and $V_{primary\_winding\_max}$ are essentially negligible as compared to $V_{input}$.

The "threshold value" of the impedance of the converter 18 at its input terminals 12, 20 ($Z_{threshold\_value}$), i.e., the maximum allowed input impedance of the converter 18 at its input terminals 12, 20 before the Schmitt trigger 32 will be automatically triggered and the power supply 10's above feedback process will begin to operate may be calculated as:

$$Z_{threshold\_value} = \frac{V_{primary\_winding\_max}}{I_{converter\_input\_max}} = \frac{195 \text{ V}}{29.6 \text{ mA}} = 6.59 \text{ k}\Omega$$

If the input impedance of the converter 18 at its input terminals 12, 20 is larger than $Z_{threshold\_value}$, then the Schmitt trigger 32 will be automatically triggered and the power supply 10's above feedback process will begin to operate.

FIG. 1 Power Supply 10—Calculation of $V_{primary\_winding}$ as a Function of $Z_{load}$, Case 1 ($V_{input}$=14 kV and $Z_{load}$=20Ω):

Let it also be assumed that $Z_{load}$=20Ω. In such a case, if the power supply 10's above feedback process doesn't operate initially, the input impedance at the converter 18's input terminals 12, 20 can be approximately calculated as:

$$Z_{converter\_input} = Z_{load} \times N^2 = 20 \ \Omega \times 30^2 = 18 \text{ k}\Omega$$

Since the above value of $Z_{converter\_input}$ is far larger than the above $Z_{threshold\_value}$=6.59 kΩ, the Schmitt trigger 32 will be automatically triggered and the power supply 10's above feedback process will begin to operate. If it is also assumed that the dc output voltage of the power supply 10 ($V_{load\_dc}$) is 5 V, then the power supply 10's output power to the load ($P_{load}$) may be calculated as:

$$P_{load} = \frac{V_{load\_dc}^2}{Z_{load}} = \frac{25 \text{ V}}{20 \ \Omega} = 1.25 \text{ W}$$

The dc current to the load 28 ($I_{load\_dc}$) may be calculated as:

$$I_{load\_dc} = \frac{V_{load\_dc}}{Z_{load}} = \frac{5 \text{ V}}{20 \ \Omega} = 250 \text{ mA}$$

Let it also be assumed that the secondary side ac to dc transfer ratio of the converter 18 is 0.9. Then the ac current in the secondary winding 26b of the power transformer 26 ($I_{secondary\_winding\_ac}$) may be calculated as:

$$I_{secondary\_winding\_ac} = \frac{I_{load\_dc}}{0.9} = 277.8 \text{ mA}$$

The ac input voltage (rms) across the primary winding 26a of the power transformer 26 ($V_{primary\_winding}$) may be calculated as:

$$V_{primary\_winding} = \frac{P_{total\_input}}{I_{converter\_input}}$$

where $P_{total\_input}$ is the total input power to the converter 18.

Accordingly, it is seen that in order to calculate $V_{primary\_winding}$ it is first necessary to calculate $P_{total\_input}$, which may be done as follows:

$$P_{total\_input} = P_{load} + P_{converter\_loss}$$

where:

$$P_{converter\_loss} = P_{ac\_switch\_loss} + P_{transformer\_loss} + P_{driver\_loss} + P_{dc\_switch\_loss} + P_{rectifier\_loss} + P_{diode\_loss} + P_{controller/regulator\_loss}$$

and where $P_{ac\_switch\_loss}$, $P_{transformer\_loss}$, $P_{driver\_loss}$, $P_{dc\_switch\_loss}$, $P_{rectifier\_loss}$, $P_{diode\_loss}$, and $P_{controller/regulator\_loss}$ are the respective power losses of the ac switch 25, transformer 26, driver 30, dc switch 62, rectifier 64, diode 65, and the combination of the controller 31 and regulator 66.

$P_{ac\_switch\_loss}$ may be calculated as follows. Assuming that the voltage dropped across the ac switch 25 ($V_{ac\_switch\_dropped}$) is 0.8 V, a typical value when the SCRs 50, 51 are in a conducting mode, then the maximum $P_{ac\_switch\_loss}$ may be calculated as:

$$P_{ac\_switch\_loss} = I_{ac\_switch} \times V_{ac\_switch\_dropped} = I_{primary\_max} \times V_{ac\_switch\_dropped}$$

$$P_{ac\_switch\_loss} = 29.6 \text{ mA} \times 0.8 \text{V} = 23.68 \text{ mW}$$

$P_{transformer\_loss}$ is mainly due to the copper loss of its secondary winding 26b. Accordingly, assuming that the impedance of its secondary winding 26b ($Z_{transformer}$) is 0.4Ω, then $P_{transformer\_loss}$ may be calculated as:

$$P_{transformer\_loss} = I_{secondary\_winding\_ac}^2 \times Z_{transformer} = 277.8 \text{ mA}^2 \times 0.4\Omega = 30.9 \text{ mW}$$

Calculating $P_{driver\_loss}$ is complex. Fortunately, $P_{driver\_loss}$ is very small when the driver 30's duty cycle, i.e., the on/off ratio of the output signal of its oscillator 54 during the power supply 10's above feedback process, is designed to be small, such as 0.2. Accordingly, for all practical purposes it may be assumed that $P_{driver\_loss}$=0, since the actual amount of the driver 30's power loss is relatively insignificant as compared to the total output power delivered by the secondary winding 26b of the power transformer 26.

$P_{dc\_switch\_loss}$ may be calculated as follows. Assuming that when the ac switch 25 is open the leakage current from the secondary winding 26b to the dc switch 62 ($I_{dc\_switch\_leakage}$) is 5% of $I_{secondary\_winding\_ac}$, and that the voltage dropped across the dc switch 62 when it is on ($V_{dc\_switch\_dropped}$)=0.4 V, then $P_{dc\_switch\_loss}$ may be calculated as:

$$P_{dc\_switch\_loss} = I_{dc\_switch\_leakage} \times V_{dc\_switch\_dropped} = (5\% \times 277.8 \text{ mA}) \times 0.4 \text{V} = 5.6 \text{ mW}$$

$P_{rectifier\_loss}$ and $P_{diode\_loss}$ may be calculated as follows. Assuming that the voltage dropped across the rectifier 64 ($V_{rectifier\_dropped}$) and the voltage dropped across the diode 65 ($V_{diode\_dropped}$) are each=0.2V, then $P_{rectifier\_loss}$ and $P_{diode\_loss}$ may be calculated as:

$$P_{rectifier\_loss} = I_{secondary\_winding\_ac} \times V_{rectifier\_dropped} = 277.8 \text{ mA} \times 0.2V = 55.56 \text{ mW}$$

$$P_{diode\_loss} = I_{secondary\_winding\_ac} \times V_{diode\_dropped} = 277.8 \text{ mA} \times 0.2V = 55.56 \text{ mW}$$

$P_{controller/regulator\_loss}$ may be calculated as follows. Assuming that the combined efficiency of the regulator 66 and the controller 31 is 95%, then $P_{controller/regulator\_loss}$ may be calculated as:

$$P_{controller/regulator\_loss} = P_{load} \times 5\% = 62.5 \text{ mW}$$

As was set forth above:

$$P_{converter\_loss} = P_{ac\_switch\_loss} + P_{transformer\_loss} + P_{driver\_loss} + P_{dc\_switch\_loss} + P_{rectifier\_loss} + P_{diode\_loss} + P_{controller/regulator\_loss}$$

Accordingly:

$$P_{converter\_loss} = 23.68 \text{ mW} + 30.9 \text{ mW} + 0 \text{ W} +$$
$$5.6 \text{ mW} + 55.56 \text{ mW} + 55.56 \text{ mW} + 62.5 \text{ mW}$$
$$= 233.8 \text{ mW}$$

From the above, the total input power the converter 18 may be calculated as:

$$P_{total\_input} = P_{load} + P_{converter\_loss} = 1.25 \text{ W} + 233.8 \text{ mW} = 1.484 \text{ W}$$

Therefore, when $Z_{load}$=20Ω, the voltage across the primary winding 26a ($V_{primary\_winding}$) may be calculated as:

$$V_{primary\_winding} = \frac{P_{total\_input}}{I_{converter\_input\_max}} = \frac{1.484 \text{ W}}{29.6 \text{ mA}} = 50 \text{ V}$$

FIG. 1 Power Supply 10—Calculation of $V_{primary\_winding}$ as a Function of $Z_{load}$,
Case 2 ($V_{input}$=14 kV and $Z_{load}$=20Ω); and
Case 3 ($V_{input}$=14 kV and $Z_{load}$=∞Ω (Open Circuit)):

In a similar way, if it assumed that $Z_{load}$=200Ω, then $V_{primary\_winding}$ may be calculated to be 5.64V; and if it is assumed that $Z_{load}$=∞Ω (an open circuit), then $V_{primary\_winding}$ may be calculated to be 0.8V.

FIG. 1 Power Supply 10 and FIG. 5 Power Supply 79—Comparison of Calculations OF $V_{primary\_winding}$ as a Function OF $Z_{load}$ As has been mentioned, the FIG. 1 power supply 10 and the FIG. 5 power supply 79 are both impedance dropping power supplies because they both utilize a high impedance device 16 in series with the primary winding 26a of their respective power transformers 26.

However, the performances of the power supplies 10, 79 are remarkably different, as shown by the above calculations. For example, when $V_{input}$=14 kV, then the above calculations showed that their respective $V_{primary\_winding}$ were:

| LOAD 28 ($Z_{load}$) | FIG. 1 POWER SUPPLY 10 $V_{primary\_winding}$ | FIG. 5 POWER SUPPLY 79 $V_{primary\_winding}$ |
|---|---|---|
| 20 Ω | 50 V | 532.8 V |
| 200 Ω | 5.64 V | 4,990 V |
| ∞ Ω (Open Circuit) | 0.8 V | 14,000 V (Full $V_{input}$ across terminals 12, 13) |

As seen in the above table, the power supply 10 controlled its $V_{primary\_winding}$ and maintained it at very low levels (less than 50V, and actually decreasing as $Z_{load}$ increased), despite a huge variation in $Z_{load}$ from 20Ω to infinity (open circuit).

In complete contrast, for the power supply 79, its $V_{primary\_winding}$ inexorably increased as $Z_{load}$ increased, with its $V_{primary\_winding}$ increasing to the full $V_{input}$ of 14 kV across terminals 12, 13 as $Z_{load}$ was increased to infinity (open circuit).

Thus, a great advantage of the power supply 10 over the power supply 79 is that the power supply 10 may use a power transformer 26 having a low voltage primary winding 26a, while the power supply 79 is forced to use a power transformer 26 having a high voltage primary winding 26a, even though both of the power supplies have a $V_{input}$ of 14 kV.

As a result, as was explained above, the power supply 10 may then offer the benefits of being smaller in size, lighter in weight, and less in cost than the power supply 79 since the power supply 10 is able to utilize a power transformer 26 having a primary winding 26a that has a lower rated maximum operating voltage than would other wise be the case if the power supply 10 did not have a converter 18.

FIG. 1 Power Supply 10—Calculation OF $Z_{converter\_input}$ and $P_{converter\_loss}$ as a Function OF $Z_{load}$ Turning again to the FIG. 1 circuit, it will now be determined what effect varying the impedance of the load 28 ($Z_{load}$) has on the average input impedance of the converter 18 at its input terminals 12, 20 ($Z_{converter\_input}$) and on the power loss (heat dissipation) of the converter 18 ($P_{converter\_loss}$).

Let it be assumed that the ac input voltage across terminals 12, 13 ($V_{input}$) has a voltage of 8 kV and a frequency (f) of 60 cps; that the turns ratio of the power transformer 26 (N)=30:1; and that the combined capacitance (C) of the high voltage capacitors 17 is 5.61 nF, so that the total impedance of the high voltage capacitors 17 ($Z_c$)=472.8 kΩ as was calculated above.

Let it also be assumed that the upper limit voltage of the Schmitt trigger 32 is 6.5 V. In such a case, the maximum ac voltage across the secondary winding 26b of the power transformer 26 ($V_{secondary\_winding\_max}$) will also be 6.5 V, since it is approximately equal to the upper limit voltage of the Schmitt trigger 32. With the forgoing assumptions, $P_{converter\_loss}$ may be approximately calculated for various value of $Z_{load}$ as follows.

During operation of the power supply 10, when $V_{secondary\_winding\_max}$ reaches 6.5 V, the controller control signals 70 generated during the power supply 10's above feedback process will cause the ac switch 25 and the dc switch 62 to close, thereby cutting off input power to the capacitors 44, 45 in the controller 31. Therefore, the maximum ac voltage across the primary winding 26a of the power transformer 26 ($V_{primary\_winding\_max}$) may be calculated as:

$$V_{primary\_winding\_max} = V_{secondary\_winding\_max} \times N = 6.5V \times 30 = 195V$$

Furthermore, the maximum current passing through the converter 18's input terminals 12, 20 ($I_{converter\_input\_max}$) may be calculated as:

$$I_{converter\_input\_max} = \frac{(V_{input} - V_{primary\_winding\_min})}{Z_c} \approx \frac{(8\text{ kV} - 0\text{ V})}{472.8\text{ k}\Omega} = 16.9\text{ mA}$$

where $V_{primary\_winding\_min}$ is the minimum possible voltage across the primary winding 26a.

The maximum allowed input impedance of the converter 18 at its input terminals 12, 20 before the Schmitt trigger 32 will be automatically triggered and the power supply 10's above feedback process will begin to operate ($Z_{threshold\_value}$) may be calculated as $$Z_{threshold\_value} = \frac{V_{primary\_winding\_max}}{I_{converter\_input\_max}} = \frac{195\text{ V}}{16.9\text{ mA}} = 11.5\text{ k}\Omega$$

As soon as the input impedance at the input terminals 12, 20 becomes larger than $Z_{threshold\_value}$, then the Schmitt trigger 32 will be automatically triggered and the power supply 10's above feedback process will begin to operate.

FIG. 1 Power Supply 10—Calculation OF $Z_{converter\_input}$ and $P_{converter\_loss}$ as a Function OF $Z_{load}$, Case 1 ($V_{input}$=8 kV and $Z_{load}$=20Ω):

Let it also be assumed that $Z_{load}$=20Ω. In such a case, if the power supply 10's above feedback process doesn't operate initially, the input impedance at the terminals 12, 20 can be approximately calculated as:

$$Z_{converter\_input} = Z_{load} \times N^2 = 20\Omega \times 30^2 = 18\text{ k}\Omega$$

Since the above value of $Z_{converter\_input}$ is far larger than the above $Z_{threshold\_value}$=11.5 kΩ, the Schmitt trigger 32 will be automatically triggered and the power supply 10's above feedback process will begin to operate. If it is also assumed that the dc output voltage of the power supply 10 ($V_{load\_dc}$) is 5 V, then the power supply 10's output power to the load ($P_{load}$) may be calculated as:

$$P_{load} = \frac{V_{load\_dc}^2}{Z_{load}} = \frac{25\text{ V}}{20\text{ }\Omega} = 1.25\text{ W}$$

The dc current to the load 28 ($I_{load\_dc}$) may be calculated as:

$$I_{load\_dc} = \frac{V_{load\_dc}}{Z_{load}} = \frac{5\text{ V}}{20\text{ }\Omega} = 250\text{ mA}$$

Let it also be assumed that the secondary side ac to dc transfer ratio of the converter 18 is 0.9. Then the ac current in the secondary winding 26b of the power transformer 26 ($I_{secondary\_winding\_ac}$) may be calculated as:

$$I_{secondary\_winding\_ac} = \frac{I_{load\_dc}}{0.9} = 277.8\text{ mA}$$

The power loss (heat dissipation) of the converter 18 (P converter loss) may be calculated as follows:

$$P_{converter\_loss} = P_{ac\_switch\_loss} + P_{transformer\_loss} + P_{driver\_loss} + P_{dc\_switch\_loss} + P_{rectifier\_loss} + P_{diode\_loss} + P_{controller/regulator\_loss}$$

where $P_{ac\_switch\_loss}$, $P_{transformer\_loss}$, $P_{driver\_loss}$, $P_{dc\_switch\_loss}$, $P_{rectifier\_loss}$, $P_{diode\_loss}$, and $P_{controller/regulator\_loss}$ are the respective power losses of the ac switch 25, the transformer 26, the driver 30, the dc switch 62, the rectifier 64, the diode 65, and the combination of the controller 31 and regulator 66.

$P_{ac\_switch\_loss}$ may be calculated as follows. Assuming that the voltage dropped across the ac switch 25 ($V_{ac\_switch\_dropped}$) is 0.8 V, a typical value when the SCRs 50, 51 are in a conducting mode, then the maximum $P_{ac\_switch\_loss}$ may be calculated as:

$$P_{ac\_switch\_loss} = I_{ac\_switch} \times V_{ac\_switch\_dropped} = I_{primary\_max} \times V_{ac\_switch\_dropped}$$

$$P_{ac\_switch\_loss} = 16.9\text{ mA} \times 0.8\text{V} = 13.52\text{ mW}$$

$P_{transformer\_loss}$ is mainly due to the copper loss of its secondary winding 26b. Accordingly, assuming that the impedance of its secondary winding 26b ($Z_{transformer}$) is 0.4Ω, then $P_{transformer\_loss}$ may be calculated as:

$$P_{transformer\_loss} = I_{secondary\_winding\_ac}^2 \times Z_{transformer} = 277.8\text{ mA}^2 \times 0.4\Omega = 30.9\text{ mW}$$

Calculating the power loss of the driver 30 ($P_{driver\_loss}$) is complex. Fortunately, $P_{driver\_loss}$ is very small when the driver 30's duty cycle, i.e., the on/off ratio of the output signal of its oscillator 54 during the power supply 10's above feedback process, is designed to be small, such as 0.2. Accordingly, for all practical purposes it may be assumed that $P_{driver\_loss}$=0, since the actual amount of the power loss of the driver 30 is relatively insignificant as compared to the total output power delivered by the secondary winding 26b of the power transformer 26.

The power loss of the dc switch 62 ($P_{dc\_switch\_loss}$) may be calculated as follows. Assuming that when the ac switch 25 is off (open) the leakage current from the secondary winding 26b to the dc switch 62 ($I_{dc\_switch\_leakage}$) is 5% of $I_{secondary\_winding\_ac}$, and that the voltage dropped across the dc switch 62 when it is on ($V_{dc\_switch\_dropped}$)=0.4 V, then $P_{dc\_switch\_loss}$ may be calculated as:

$$P_{dc\_switch\_loss} = I_{dc\_switch\_leakage} \times V_{dc\_switch\_dropped} = (5\% \times 277.8\text{ mA}) \times 0.4\text{V} = 5.6\text{ mW}$$

The respective power losses of the rectifier 64 ($P_{rectifier\_loss}$) and the diode 65 ($P_{diode\_loss}$) may be calculated as follows. Assuming that the voltage dropped across the rectifier 64 ($V_{rectifier\_dropped}$) and the voltage dropped across the diode 65 ($V_{diode\_dropped}$) are each=0.2V, then $P_{rectifier\_loss}$ and $P_{diode\_loss}$ may be calculated as:

$$P_{rectifier\_loss} = I_{secondary\_winding\_ac} \times V_{rectifier\_dropped} = 277.8\text{ mA} \times 0.2\text{V} = 55.56\text{ mW}$$

$$P_{diode\_loss} = I_{secondary\_winding\_ac} \times V_{diode\_dropped} = 277.8\text{ mA} \times 0.2\text{V} = 55.56\text{ mW}$$

The combined power loss of the controller 31 and the regulator 66 ($P_{controller/regulator\_loss}$) may be calculated as follows. Assuming that the combined efficiency of the regulator 66 and the controller 31 to be 95%, then $P_{controller/regulator\_loss}$ may be calculated as:

$$P_{controller/regulator\_loss} = P_{load} \times 5\% = 62.5 \text{ mW}$$

As was set forth above:

$$P_{converter\_loss} = P_{ac\_switch\_loss} + P_{transformer\_loss} + P_{driver\_loss} + P_{dc\_switch\_loss} + P_{rectifier\_loss} + P_{diode\_loss} + P_{controller/regulator\_loss}$$

Accordingly:

$$P_{converter\_loss} = 13.52 \text{ mW} + 30.9 \text{ mW} + 0 \text{ W} + 5.6 \text{ mW} + 55.6 \text{ mW} + 55.6 \text{ mW} + 62.5 \text{ mW} = 223.64 \text{ mW}$$

From the above, the total input power to the converter 23 ($P_{converter\_input}$) may be calculated as:

$$P_{converter\_input} = P_{load} + P_{converter\_loss} = 1.25 \text{ W} + 223.64 \text{ mW} = 1.474 \text{ W}$$

When $Z_{load} = 20\Omega$, the voltage across the primary winding 26a ($V_{primary\_winding}$) may then be calculated as:

$$V_{primary\_winding} = \frac{P_{converter\_input}}{I_{converter\_input\_max}} = \frac{1.474 \text{ W}}{16.9 \text{ mA}} = 87.2 \text{ V}$$

Therefore, when $Z_{load} = 20\Omega$ the average input impedance across the converter 18's input terminals 12, 20 ($Z_{converter\_input}$) may be calculated as:

$$Z_{converter\_input} = \frac{V_{primary\_winding}}{I_{converter\_input\_max}} = \frac{87.2 \text{ V}}{16.9 \text{ mA}} = 5.16 \text{ k}\Omega$$

FIG. 1 Power Supply 10—Calculation of $Z_{converter\_input}$ and $P_{converter\_loss}$ as a Function of $Z_{load}$,
Case 2 ($V_{input}=8$ kV and $Z_{load}=20\Omega$),
Case 3 ($V_{input}=14$ kV and $Z_{load}=20\Omega$), and
Case 4 ($V_{input}=14$ kV and $Z_{load}=20\Omega$):

Similarly, when $V_{input}=8$ kV and $Z_{load}=20\Omega$, then $Z_{converter\_input}$ may be calculated to be 549.1$\Omega$, $V_{primary\_winding}$ may be calculated to be 9.28 V, $P_{converter\_input}$ may be calculated to be 156.79 mW, $P_{load}$ may be calculated to be 125 mW, and $P_{converter\_loss}$ may be calculated to be 31.79 mW.

Similarly, when $V_{input}=14$ kV and $Z_{load}=20\Omega$, then $Z_{converter\_input}$ may be calculated to be 1.69 k$\Omega$, $V_{primary\_winding}$ may be calculated to be 50 V, $P_{converter\_input}$ may be calculated to be 1.483 W, $P_{load}$ may be calculated to be 1.25 W, and $P_{converter\_loss}$ may be calculated to be 233.8 mW.

Similarly, when $V_{input}=14$ kV and $Z_{load}=200\Omega$, then $Z_{converter\_input}$ may be calculated to be 190.54$\Omega$, $V_{primary\_winding}$ may be calculated to be 5.64 V, $P_{converter\_input}$ may be calculated to be 166.95 mW, $P_{load}$ may be calculated to be 125 mW, and $P_{converter\_loss}$ may be calculated to be 41.95 mW.

FIG. 1 Power Supply 10—Summary of Calculations of $Z_{converter\_input}$ and $P_{converter\_loss}$ as a Function OF $Z_{load}$ The results of the forgoing calculations are summarized in the following table.

The above table clearly demonstrates that $Z_{converter\_input}$ adaptively changed as a function of $Z_{load}$. In particular, $Z_{converter\_input}$ adaptively decreased as $Z_{load}$ increased, regardless of the value for $V_{input}$. Similarly, $P_{load}$ adaptively changed as a function of $Z_{converter\_input}$. In particular $P_{load}$ adaptively decreased as $Z_{converter\_input}$ increased.

As a result, the power supply 10 controlled its $V_{primary\_winding}$ and maintained it at very low levels of 87.2 V, or less, despite a $V_{input}$ of up to 14 k, and despite a 10-fold increase in $Z_{load}$ from 20$\Omega$, up to 200$\Omega$. The importance of the power supply 10 controlling its $V_{primary\_winding}$ and maintaining it at very low levels was explained above.

As a further result, $P_{converter\_loss}$ (the heat dissipated by the converter 18), was maintained at very low levels of 223.8 mW, or less, again despite a $V_{input}$ of up to 14 kV, and despite a 10-fold increase in $Z_{load}$ from 20$\Omega$ to 200$\Omega$. It may be very important that the converter 18 dissipate as little heat as possible in order to help improve its efficiency, and to help prevent the premature aging, damage, or failure of the various components of the power supply 10 that might otherwise occur if the converter 18 dissipated large amounts of heat.

The power supply 10a of FIG. 4:

Turning now to FIG. 4, the power supply 10a of FIG. 4 is the same as, or at least similar to, the power supply 10 of FIGS. 1-3 in all respects, except for those differences that will be made apparent by all of the disclosures herein. Accordingly, the same reference numerals have been used in FIGS. 1 and 4 for the corresponding parts of the power supplies 10, 10a.

As seen in FIG. 4, the power supply 10a may not have the power supply 10's ac switch 25, driver 30, and their associated wiring. As a result, the power supply 10a's dc switch 62 becomes the major component that controls the input power to the controller 31 and to the voltage regulator 66, and that controls the power supply 10a's maximum output power to the load 28.

The operation of the power supply 10a is generally the same as that described above for the power supply 10, except for the operation of the power supply 10's ac switch 25 and driver 30.

As was the case for the power supply 10, the average input impedance of the power supply 10a's converter 18 at its input terminals 12, 20 adaptively changes as a function of the impedance of the load 28. In particular, the average input impedance of the power supply 10a's converter 18 adaptively decreases as the impedance of the load 28 increases, and vice versa. Similarly, the output power of the power supply 10a that is available to the load 28 adaptively changes as a function of the impedance of the load 28. In particular, the output power of the power supply 10a that is available to the load 28 adaptively decreases as the impedance of the load 28 increases, and vice versa.

Benefits of the power supply 10a as compared to the power supply 10, are that the power supply 10a may be less expensive to produce, weigh less, and be more compact that the power supply 10, since the power supply 10a does not have the power supply 10's ac switch 25, driver 30, and their associated wiring.

| $Z_{load}$ | $Z_{converter\_input}$ | $P_{converter\_input}$ | $P_{load}$ | $P_{converter\_loss}$ | $V_{primary\_winding}$ |
|---|---|---|---|---|---|
| 20 $\Omega$ ($V_{input}$ = 8 kV) | 5.16 k$\Omega$ | 1.474 W | 1.25 W | 223.64 mW | 87.2 V |
| 200 $\Omega$ ($V_{input}$ = 8 kV) | 549.1 $\Omega$ | 156.79 W | 125 mW | 31.79 mW | 9.28 V |
| 20 $\Omega$ ($V_{input}$ = 14 kV) | 1.69 k$\Omega$ | 1.483 W | 1.25 W | 233.8 mW | 50 V |
| 200 $\Omega$ ($V_{input}$ = 14 kV) | 190.54 $\Omega$ | 166.95 W | 125 mW | 41.95 mW | 5.64 V |

A detriment of the power supply 10a may be that it will generate more waste heat than the power supply 10, due to increased copper loss in the secondary winding 26b of the transformer 26 and increased power loss in the dc switch 62, since the power supply 10a has no ac switch 25 that would enable it to periodically cut off the ac input power to the transformer 26 and dc switch 62. Nevertheless, in many circumstances, the increased amount of waste heat generated by the power supply 10a may be easily dissipated, particularly when the input current to the converter 18 is relatively low.

It is to be understood that, without departing from the scope and spirit of the claimed invention, any particular circuit in the power supply 10 may be suitably combined or formed with one or more of its other circuits, to form one or more larger circuits (e.g., the driver 30 may be made part of the controller 31). Similarly, any particular circuit in the power supply 10 may be divided into two or more separate sub-circuits (e.g., the Schmidt trigger 32 in the controller 31 may be made as a circuit which is separate from the controller 31), in which case such sub-circuits may be electrically connected together with the other components in the power supply 10 in any suitable way.

It is also to be understood that the specific embodiments of the claimed invention that are disclosed herein were disclosed strictly by way of non-limiting example. Accordingly, various modifications may be made to those embodiments without deviating from the scope and spirit of the claimed invention. Additionally, certain aspects of the claimed invention that were described in the context of a particular embodiment may be combined or eliminated in other embodiments. Although advantages associated with a certain embodiment of the claimed invention have been described in the context of that embodiment, other of the embodiments may also exhibit such advantages. Further, not all embodiments need necessarily exhibit any or all of such advantages in order to fall within the scope of the claimed invention.

Before an element in a claim is construed as claiming a means for performing a specified function under 35 USC section 112, last paragraph, the words "means for" must be used in conjunction with that element.

As used herein, except in the claims, the words "and" and "or" are each defined to also carry the meaning of "and/or".

In view of all of the disclosures herein, these and further modifications, adaptations and variations of the claimed invention will now be apparent to those of ordinary skill in the art to which it pertains, within the scope of the following claims.

What is claimed is:

1. An impedance dropping power supply that is operable to convert a high ac input voltage from an ac source into a dc output voltage for a load having a load impedance;
   wherein said power supply comprises an impedance controlled converter having an average converter input impedance;
   wherein said converter comprises an ac switch, a dc switch, a power transformer, a diode, a controller, a rectifier, and a driver;
   wherein said power transformer comprises a primary winding that is operable to receive a primary winding ac input voltage from said ac source;
   wherein said converter is operable to control said average converter input impedance as a function of said load impedance to keep said primary winding ac input voltage at a voltage which is less than a predetermined maximum voltage;
   wherein said converter is operable to decrease said average converter input impedance as said load impedance increases, and is operable to increase said average converter input impedance as said load impedance decreases;
   wherein said converter is operable to control said primary winding ac input voltage as a function of said load impedance, is operable to decrease said primary winding ac input voltage as said load impedance increases, and is operable to increase said primary winding ac input voltage as said load impedance decreases;
   wherein said controller comprises a Schmidt trigger and at least one controller capacitor; wherein a discharge rate of said at least one controller capacitor is at least partially a function of said load impedance; wherein said Schmidt trigger circuit is operable to generate controller control signals as a function of said load impedance;
   wherein said driver is operable to generate driver control signals as a function of said controller control signals;
   wherein said power transformer is operable to convert said primary winding ac input voltage into a secondary winding ac output current; wherein said rectifier is operable to convert at least some of said secondary winding ac output current into a rectifier dc output current;
   wherein said ac switch is operable to selectively permit and prevent a receipt by said rectifier of at least some of said secondary winding ac output current; wherein said ac switch is operable to periodically open and close as a function of said driver control signals;
   wherein said dc switch is operable to selectively permit and prevent a receipt by said controller of at least some of said rectifier dc output current; wherein said dc switch is operable to periodically open and close as a function of said controller control signals;
   wherein said at least one controller capacitor is operable to continue to supply electrical energy to said load, to said ac switch, to said dc switch, to said Schmidt trigger and to said driver for a period of time while said ac switch is operable to selectively prevent a receipt by said rectifier of at least some of said secondary winding ac output current and while said dc switch is operable to prevent a receipt by said controller of at least some of said rectifier dc output current; and
   wherein said diode is operable to block at least some of a flow of electrical current from said controller to said dc switch while said dc switch is operable to prevent a receipt by said controller of at least some of said rectifier dc output current.

2. The power supply of claim 1, wherein said predetermined maximum voltage is about 600 V ac.

3. The power supply of claim 1, wherein said predetermined maximum voltage is about 1 kV ac.

4. The power supply of claim 1, wherein said predetermined maximum voltage is about 2 kV ac.

5. The power supply of claim 1, wherein said primary winding ac input voltage is less than about $1/10^{th}$ of said high ac input voltage.

6. The power supply of claim 1, wherein said primary winding ac input voltage falls in a range of from about $1/2$ to about $1/10^{th}$ of said high ac input voltage.

7. An impedance dropping power supply that is operable to convert a high ac input voltage from an ac source into a dc output voltage for a load having a load impedance;
   wherein said power supply comprises an impedance controlled converter having an average converter input impedance;
   wherein said converter comprises a controller, a dc switch, a rectifier, an ac switch, and power transformer;

wherein said power transformer comprises a primary winding that is operable to receive a primary winding ac input voltage from said ac source;

wherein said converter is operable to control said average converter input impedance as a function of said load impedance to keep said primary winding ac input voltage at a voltage which is less than a predetermined maximum voltage;

wherein said controller is operable to generate controller control signals as a function of said load impedance;

wherein said power transformer is operable to convert said primary winding ac input voltage into a secondary winding ac output current; wherein said rectifier is operable to convert at least some of said secondary winding ac output current into a rectifier dc output current;

wherein said ac switch is operable to selectively permit and prevent a receipt by said rectifier of at least some of said secondary winding ac output current; wherein said ac switch is operable to periodically open and close as a function of said controller control signals; and wherein said dc switch is operable to selectively permit and prevent a receipt by said controller of at least some of said rectifier dc output current; wherein said dc switch is operable to periodically open and close as a function of said controller control signals.

8. The power supply of claim 7, wherein said converter further comprises a diode; and wherein said diode is operable to block at least some of a flow of electrical current from said controller to said dc switch while said dc switch is operable to prevent a receipt by said controller of at least some of said rectifier dc output current.

9. The power supply of claim 7, wherein said predetermined maximum voltage is about 600 V ac.

10. The power supply of claim 7, wherein said predetermined maximum voltage is about 1 kV ac.

11. The power supply of claim 7, wherein said predetermined maximum voltage is about 2 kV ac.

12. The power supply of claim 7, wherein said primary winding ac input voltage is less than about $1/10^{th}$ of said high ac input voltage.

13. The power supply of claim 7, wherein said primary winding ac input voltage falls in a range of from about $1/2$ to about $1/10^{th}$ of said high ac input voltage.

14. The power supply of claim 7, wherein said controller comprises at least one controller capacitor; wherein a discharge rate of said at least one controller capacitor is at least partially a function of said load impedance; and wherein said at least one controller capacitor is operable to continue to supply electrical energy to said load for a period of time while said ac switch is operable to selectively prevent a receipt by said rectifier of at least some of said secondary winding ac output current and while said dc switch is operable to prevent a receipt by said controller of at least some of said rectifier dc output current.

15. The power supply of claim 14, wherein said at least one controller capacitor is also operable to continue to supply electrical energy to said ac switch and to said dc switch for a period of time while said ac switch is operable to selectively prevent a receipt by said rectifier of at least some of said secondary winding ac output current and while said dc switch is operable to prevent a receipt by said controller of at least some of said rectifier dc output current.

16. The power supply of claim 14, wherein said controller comprises a Schmidt trigger circuit; wherein said Schmidt trigger circuit is operable to generate said controller control signals as a function of said load impedance.

17. The power supply of claim 16, wherein said at least one controller capacitor is also operable to continue to supply electrical energy to said Schmidt trigger circuit for a period of time while said ac switch is operable to selectively prevent a receipt by said rectifier of at least some of said secondary winding ac output current and while said dc switch is operable to prevent a receipt by said controller of at least some of said rectifier dc output current.

18. The power supply of claim 14, wherein said converter comprises a driver; wherein said driver is operable to generate driver control signals as a function of said controller control signals; and wherein said ac switch is operable to periodically open and close as a function of said driver control signals.

19. The power supply of claim 18, wherein said at least one controller capacitor is also operable to continue to supply electrical energy to said driver for a period of time while said ac switch is operable to selectively prevent a receipt by said rectifier of at least some of said secondary winding ac output current and while said dc switch is operable to prevent a receipt by said controller of at least some of said rectifier dc output current.

20. An impedance dropping power supply that is operable to convert a high ac input voltage from an ac source into a dc output voltage for a load having a load impedance;

wherein said power supply comprises an impedance controlled converter having an average converter input impedance; wherein said converter comprises a power transformer; wherein said power transformer comprises a primary winding that is operable to receive a primary winding ac input voltage from said ac source;

wherein said converter is operable to control said average converter input impedance as a function of said load impedance to keep said primary winding ac input voltage at a voltage which is less than a predetermined maximum voltage; and wherein said converter is operable to decrease said average converter input impedance as said load impedance increases, and is operable to increase said average converter input impedance as said load impedance decreases.

21. The power supply of claim 20, wherein said converter is operable to decrease said primary winding ac input voltage as said load impedance increases, and is operable to increase said primary winding ac input voltage as said load impedance decreases.

22. An impedance dropping power supply that is operable to convert a high ac input voltage from an ac source into a dc output voltage for a load having a load impedance;

wherein said power supply comprises an impedance controlled converter having an average converter input impedance; wherein said converter comprises a power transformer; wherein said power transformer comprises a primary winding that is operable to receive a primary winding ac input voltage from said ac source;

wherein said converter is operable to control said average converter input impedance as a function of said load impedance to keep said primary winding ac input voltage at a voltage which is less than a predetermined maximum voltage;

wherein said converter comprises a controller, a dc switch, and a rectifier that is operable to convert a rectifier ac input current into a rectifier dc output current; and wherein said dc switch is operable to selectively permit and prevent a receipt by said controller of at least some of said rectifier dc output current; wherein said controller is operable to generate controller control signals as a function of said load impedance; and wherein said dc switch is operable to periodically open and close as a function of said controller control signals.

23. The power supply of claim 22, wherein dc switch is connected in parallel with said controller; wherein said dc switch is open said dc switch is operable to permit a receipt by said controller of at least some of said rectifier dc output current; and wherein when said dc switch is closed said dc switch is operable to prevent a receipt by said controller of at least some of said rectifier dc output current.

24. The power supply of claim 23, wherein said converter further comprises a diode; and wherein said diode is operable to block at least some of a flow of electrical current from said controller to said dc switch while said dc switch is operable to prevent a receipt by said controller of at least some of said rectifier dc output current.

25. The power supply of claim 22, wherein said controller comprises at least one controller capacitor; wherein a discharge rate of said at least one controller capacitor is at least partially a function of said load impedance; and wherein said at least one controller capacitor is operable to continue to supply electrical energy to said load for a period of time while said dc switch is operable to prevent a receipt by said controller of at least some of said rectifier dc output current.

26. The power supply of claim 25, wherein said at least one controller capacitor is also operable to continue to supply electrical energy to said dc switch for a period of time while said dc switch is operable to prevent a receipt by said controller of at least some of said rectifier dc output current.

27. The power supply of claim 25, wherein said controller comprises a Schmidt trigger circuit; wherein said Schmidt trigger circuit is operable to generate said controller control signals as a function of said load impedance.

28. The power supply of claim 27, wherein said at least one controller capacitor is also operable to continue to supply electrical energy to said Schmidt trigger circuit for a period of time while said dc switch is operable to prevent a receipt by said controller of at least some of said rectifier dc output current.

29. An impedance dropping power supply that is operable to convert a high ac input voltage from an ac source into a dc output voltage for a load having a load impedance;

wherein said power supply comprises an impedance controlled converter having an average converter input impedance; wherein said converter comprises a power transformer; wherein said power transformer comprises a primary winding that is operable to receive a primary winding ac input voltage from said ac source;

wherein said converter is operable to control said average converter input impedance as a function of said load impedance to keep said primary winding ac input voltage at a voltage which is less than a predetermined maximum voltage;

wherein said converter comprises a controller, an ac switch, and a rectifier; wherein said power transformer is operable to convert said primary winding ac input voltage into a secondary winding ac output current; wherein said rectifier is operable to convert at least some of said secondary winding ac output current into a rectifier dc output current;

wherein said ac switch is operable to selectively permit a receipt by said power transformer of at least some of said primary winding ac input current to, in turn, selectively permit a receipt by said controller of at least some of said rectifier dc output current;

wherein said ac switch is operable to selectively prevent a receipt by said power transformer of at least some of said primary winding ac input voltage to, in turn, selectively prevent a receipt by said controller of at least some of said rectifier dc output current; and wherein said controller is operable to generate controller control signals as a function of said load impedance; and wherein said ac switch is operable to periodically open and close as a function of said controller control signals.

30. The power supply of claim 29, wherein said ac switch is connected in parallel with said primary winding of said power transformer; wherein when said ac switch is open said ac switch is operable to permit a receipt by said primary winding of at least some of said primary winding ac input voltage to, in turn, permit a receipt by said controller of at least some of said rectifier dc output current; and wherein when said ac switch is closed said ac switch is operable to prevent a receipt by said primary winding of at least some of said primary winding ac input voltage to, in turn, prevent a receipt by said controller of at least some of said rectifier dc output current.

31. The power supply of claim 29, wherein said controller comprises at least one controller capacitor; wherein a discharge rate of said at least one controller capacitor is at least partially a function of said load impedance; and wherein said at least one controller capacitor is operable to continue to supply electrical energy to said load for a period of time while said ac switch is operable to prevent a receipt by said primary winding of at least some of said primary winding ac input voltage to, in turn, prevent a receipt by said controller of at least some of said rectifier dc output current.

32. The power supply of claim 31, wherein said at least one controller capacitor is operable to continue to supply electrical energy to said ac switch for a period of time while said ac switch is operable to prevent a receipt by said controller of at least some of said rectifier dc output current.

33. The power supply of claim 31, wherein said controller comprises a Schmidt trigger circuit; and wherein said Schmidt trigger circuit is operable to generate said controller control signals as a function of said load impedance.

34. The power supply of claim 33, wherein said at least one controller capacitor is operable to continue to supply electrical energy to said Schmidt trigger circuit for a period of time while said ac switch is operable to prevent a receipt by said controller of at least some of said rectifier dc output current.

35. The power supply of claim 31, wherein said converter comprises a driver; wherein said driver is operable to generate driver control signals as a function of said controller control signals; and wherein said ac switch is operable to periodically open and close as a function of said driver control signals.

36. The power supply of claim 35, wherein said at least one controller capacitor is operable to continue to supply electrical energy to said driver for a period of time while said ac switch is operable to prevent a receipt by said controller of at least some of said rectifier dc output current.

37. An impedance dropping power supply that is operable to convert a high ac input voltage from an ac source into a dc output voltage for a load having a load impedance;

wherein said power supply comprises an impedance controlled converter having an average converter input impedance; wherein said converter comprises a power transformer; wherein said power transformer comprises a primary winding that is operable to receive a primary winding ac input voltage from said ac source;

wherein said converter is operable to control said average converter input impedance as a function of said load impedance to keep said primary winding ac input voltage at a voltage which is less than a predetermined maximum voltage; and wherein said power supply further comprises a temperature controlled fault control device that is operable to prevent a receipt by said converter of at least some of said ac input voltage when a predetermined temperature limit is reached by said fault control device.

38. The power supply of claim 37, wherein said fault control device is normally open when not triggered and is connected in parallel with said primary winding of said power transformer.

39. The power supply of claim 37, wherein said fault control device is normally closed when not triggered and is connected in series with said primary winding of said power transformer.

* * * * *